US010715729B2

(12) United States Patent
Kobayashi

(10) Patent No.: US 10,715,729 B2
(45) Date of Patent: Jul. 14, 2020

(54) IMAGE PROCESSING APPARATUS FOR DETECTING MOVING SUBJECT, IMAGE PROCESSING METHOD, AND STORAGE MEDIUM

(71) Applicant: CANON KABUSHIKI KAISHA, Tokyo (JP)

(72) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/272,855

(22) Filed: Feb. 11, 2019

(65) Prior Publication Data
US 2019/0260937 A1    Aug. 22, 2019

(30) Foreign Application Priority Data

Feb. 20, 2018  (JP) .................... 2018-027878

(51) Int. Cl.
*H04N 5/232* (2006.01)
*H04N 5/14* (2006.01)
*G06K 9/62* (2006.01)

(52) U.S. Cl.
CPC ....... *H04N 5/23277* (2013.01); *G06K 9/6202* (2013.01); *H04N 5/144* (2013.01); *H04N 5/23254* (2013.01)

(58) Field of Classification Search
CPC ...... G06K 9/6202; H04N 5/144; H04N 5/217; H04N 5/23254; H04N 5/23277; H04N 5/2355; G06T 7/00
See application file for complete search history.

(56) References Cited

U.S. PATENT DOCUMENTS

| | | | | |
|---|---|---|---|---|
| 8,837,773 | B2 * | 9/2014 | Katano | G06T 7/248 382/103 |
| 9,129,414 | B2 * | 9/2015 | Hirai | H04N 5/23235 |
| 2003/0128298 | A1 * | 7/2003 | Moon | G06K 9/32 348/578 |
| 2005/0196017 | A1 * | 9/2005 | Altherr | G06T 7/246 382/103 |
| 2006/0056702 | A1 * | 3/2006 | Tsunashima | G06T 7/254 382/219 |
| 2006/0114996 | A1 * | 6/2006 | Thoreau | H04N 19/129 375/240.16 |

(Continued)

FOREIGN PATENT DOCUMENTS

| | | |
|---|---|---|
| JP | 2011198241 A | 10/2011 |
| JP | 201362741 A | 4/2013 |

*Primary Examiner* — Chiawei Chen
(74) *Attorney, Agent, or Firm* — Canon U.S.A., Inc. I.P. Division

(57) ABSTRACT

An image processing apparatus configured to detect a moving subject region includes a likelihood generation unit, a similarity detection unit, and a correction unit. The likelihood generation unit detects a motion of a region in an image and, based on at least two input images, generates a moving subject likelihood for each region. The similarity detection unit detects a similarity between a target region and a peripheral region of the target region for at least one of the input images. The correction unit corrects the moving subject likelihood of the target region based on the detected similarity and the generated moving subject likelihood of the peripheral region. The moving subject region is detected based on the corrected moving subject likelihood.

20 Claims, 17 Drawing Sheets

(56) References Cited

U.S. PATENT DOCUMENTS

| | | | | |
|---|---|---|---|---|
| 2006/0215037 A1* | 9/2006 | Tsunekawa | ............ | H04N 5/145 |
| | | | | 348/211.99 |
| 2006/0285596 A1* | 12/2006 | Kondo | ................... | H04N 19/43 |
| | | | | 375/240.16 |
| 2009/0208102 A1* | 8/2009 | Watanabe | ................. | G06T 7/30 |
| | | | | 382/168 |
| 2009/0232216 A1* | 9/2009 | Kurata | ................... | H04N 5/144 |
| | | | | 375/240.16 |
| 2010/0157073 A1* | 6/2010 | Kondo | ............... | H04N 5/23248 |
| | | | | 348/208.4 |
| 2013/0070105 A1* | 3/2013 | Ike | .................... | G06K 9/00355 |
| | | | | 348/169 |
| 2013/0223686 A1* | 8/2013 | Shimizu | ................ | G08G 1/166 |
| | | | | 382/103 |
| 2014/0079333 A1* | 3/2014 | Hirai | ................. | H04N 5/23235 |
| | | | | 382/255 |
| 2014/0176740 A1* | 6/2014 | Lee | ................... | H04N 5/23254 |
| | | | | 348/208.4 |
| 2014/0375846 A1* | 12/2014 | Toyoda | .................. | G06T 5/002 |
| | | | | 348/241 |
| 2015/0146921 A1* | 5/2015 | Ono | ................... | G06K 9/00362 |
| | | | | 382/103 |

\* cited by examiner

IMAGE PROCESSING APPARATUS FOR DETECTING MOVING SUBJECT, IMAGE PROCESSING METHOD, AND STORAGE MEDIUM

BACKGROUND

Field

The present disclosure relates to an image processing technique for detecting a moving subject region from an image.

Description of the Related Art

In recent years, digital cameras, digital camcorders, and many other imaging apparatuses for combining a plurality of images and recording a combined image have been commercially produced. Some of these imaging apparatuses have a function of generating a combined image with reduced random noise by combining a plurality of images captured at different times. This allows a user to obtain a combined image with random noise further reduced than an uncombined image. However, if a subject moves when capturing a plurality of images with such a combination function set to ON, a combined image generated may contain multiple images of the moving subject. As a technique for restraining the generation of such multiple images, a certain technique is known to inhibit combination processing in a region where the movement of a subject is detected.

As a technique for detecting a moving subject region such as a moving subject, for example, Japanese Patent Application Laid-Open No. 2013-62741 discusses a technique for detecting a moving subject region based on the difference absolute value between a plurality of images reduced with a reduction ratio determined according to the amount of camera shake. The technique discussed in Japanese Patent Application Laid-Open No. 2013-62741 reduces not only positional deviations of stationary subjects due to camera shake by changing the image reduction ratio based on the amount of camera shake but also the influence of noise by reducing an image, thus improving the detection accuracy of a moving subject region. Japanese Patent Application Laid-Open No. 2011-discusses a technique for selecting low-resolution images (i.e., reduced images) according to positional deviations remaining after positioning a plurality of images, and detecting a moving subject region based on the difference absolute value between the plurality of selected low-resolution images. In the technique discussed in Japanese Patent Application Laid-Open No. 2011-198241, low-resolution images are selected according to positional deviations remaining after positioning a plurality of images to reduce positional deviations of stationary subjects due to camera shake, thus improving the detection accuracy of a moving subject region.

However, with an image containing much random noise, such as an image captured with high sensitivity, the difference absolute value between images is increased by the influence of random noise. In this case, it may be difficult to distinguish between a moving subject region and random noise. In particular, in a case where the difference absolute value between images is smaller than the difference absolute value caused by random noise, it may be difficult to detect a moving subject possibly resulting in incorrect detection of a moving subject region. When detecting a moving subject region based on reduced images as in Japanese Patent Application Laid-Open No. 2013-62741 and Japanese Patent Application Laid-Open No. 2011-198241 described above, the detected moving subject region will be subsequently enlarged into the original full-size image. Therefore, if a moving subject region is incorrectly detected, for example, a stationary region around the moving subject may be incorrectly handled as a moving subject region or, conversely, a part of a moving subject region may be incorrectly handled as a stationary region.

SUMMARY

The present disclosure is directed to improving the detection accuracy of a moving subject region such as a moving subject.

According to an aspect of the present disclosure, an image processing apparatus configured to detect a moving subject region includes a memory that stores instructions, and one or more processors configured to execute the instructions to cause the image processing apparatus to function as: a likelihood generation unit configured to detect a motion of a region in an image and, based on at least two input images, generate a moving subject likelihood for each region, a similarity detection unit configured to detect a similarity between a target region and a peripheral region of the target region for at least one of the input images, and a correction unit configured to correct the moving subject likelihood of the target region based on the detected similarity and the generated moving subject likelihood of the peripheral region, wherein the moving subject region is detected based on the corrected moving subject likelihood.

Further features of the present disclosure will become apparent from the following description of embodiments with reference to the attached drawings.

DESCRIPTION OF THE EMBODIMENTS

Embodiments of the present disclosure will be described below with reference to the accompanying drawings.

The image processing apparatus according to embodiments of the present disclosure are applicable, for example, to an imaging apparatus having a combination function of combining a plurality of images captured at different time points. The combination function combines a plurality of images captured at different times to generate a combined image and records the combined image.

Figure 1:
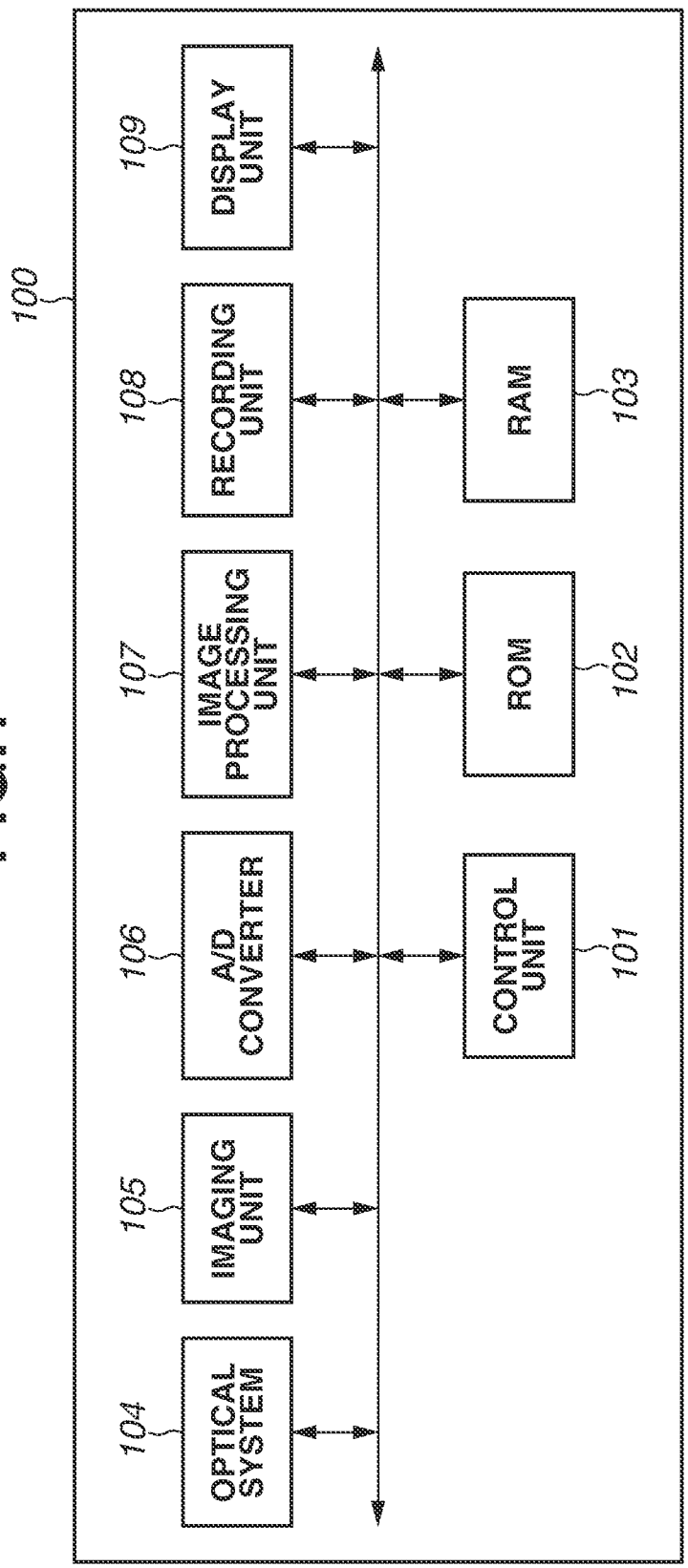
FIG. 1 illustrates an overall configuration of an imaging apparatus according to embodiments.

FIG. 1 illustrates an overall configuration of an imaging apparatus 100 as an example application of the image processing apparatus according to the present embodiment. In the imaging apparatus 100 illustrated in FIG. 1, for example, the image processing apparatus according to the present embodiment is equivalent to an image processing unit 107. For example, when the combination function is set to ON, the image processing unit 107 performs image combination processing based on the moving subject likelihood and the corrected moving subject likelihood (described below).

Referring to FIG. 1, the control unit 101 is, for example, a central processing unit (CPU) which reads an operation program for each component of the imaging apparatus 100 from a read only memory (ROM) 102, loads the program into a random access memory (RAM) 103, and executes the program to control the operation of each component of the imaging apparatus 100. The ROM 102 is electrically erasable and recordable nonvolatile memory for storing the operation program for each component of the imaging apparatus 100 and also storing parameters required for the operation of each component and processing for various calculations (described below). The RAM 103 is rewritable volatile memory used as a temporary storage area for data output during operation of each component of the imaging apparatus 100. The combination ratio curve, moving subject likelihood curve, similarity weight coefficient curve, moving subject likelihood weight coefficient curve, integrated weight coefficient curve, edge degree curve, etc. may be prestored as parameters in the ROM 102, and may be generated by program execution.

An optical system 104 formed by a lens group including a zoom lens and a focal lens forms a subject image on an imaging unit 105 (described below). The imaging unit 105 includes an image sensor such as a charge coupled device (CCD) sensor and a complementary metal oxide semiconductor (CMOS) sensor, and color filters. The imaging unit 105 performs photoelectric conversion of an optical image formed on the imaging unit 105 by the optical system 104 and outputs an acquired analog image signal to an analog-to-digital (A/D) converter 106. The A/D converter 106 converts the input analog image signal into a digital image signal and outputs obtained digital image data to the RAM 103. The A/D converter 106 includes an amplifier for amplifying an analog image signal or a digital image signal based on the amplification factor (sensitivity information) determined by the control unit 101.

The image processing unit 107 applies various image processing such as white balance adjustment, color interpolation, and gamma processing on the image data stored in the RAM 103. According to the present embodiment, the image processing unit 107 includes a combined image generation unit 200 (described below). The combined image generation unit 200 acquires a standard image and a reference image as input images from a plurality of images in the RAM 103 and performs positioning of the reference image based on the standard image. Then, based on the positioned reference image and the standard image, the combined image generation unit 200 detects a moving region such as a subject moving in the images. The combined image generation unit 200 further calculates the moving subject likelihood based on the standard image and the positioned reference image and, based on a corrected moving subject likelihood which is obtained by correcting the moving subject likelihood, combines the standard image and the positioned reference image to generate a combined image.

A recording unit 108 is, for example, a detachably attached memory card for recording images processed by the image processing unit 107 as recorded images through the RAM 103.

A display unit 109 is a display device such as a liquid crystal display (LCD) which displays images recorded in the RAM 103 and the recording unit 108 and displays an operation user interface for receiving user instructions.

Although not illustrated in FIG. 1, the imaging apparatus 100 is provided with various operation buttons such as a power switch, a shutter button, a menu button, and a playback button provided on common cameras.

Detail operations of the image processing unit 107 included in the imaging apparatus 100 according to the present embodiment will be described below. The present embodiment will be described below centering on a case where the image processing unit 107 combines two different images based on the corrected moving subject likelihood (described below). More specifically, the image processing unit 107 performs image processing for generating a combined image with reduced random noise while preventing the generation of multiple images of a moving subject.

Figure 2:
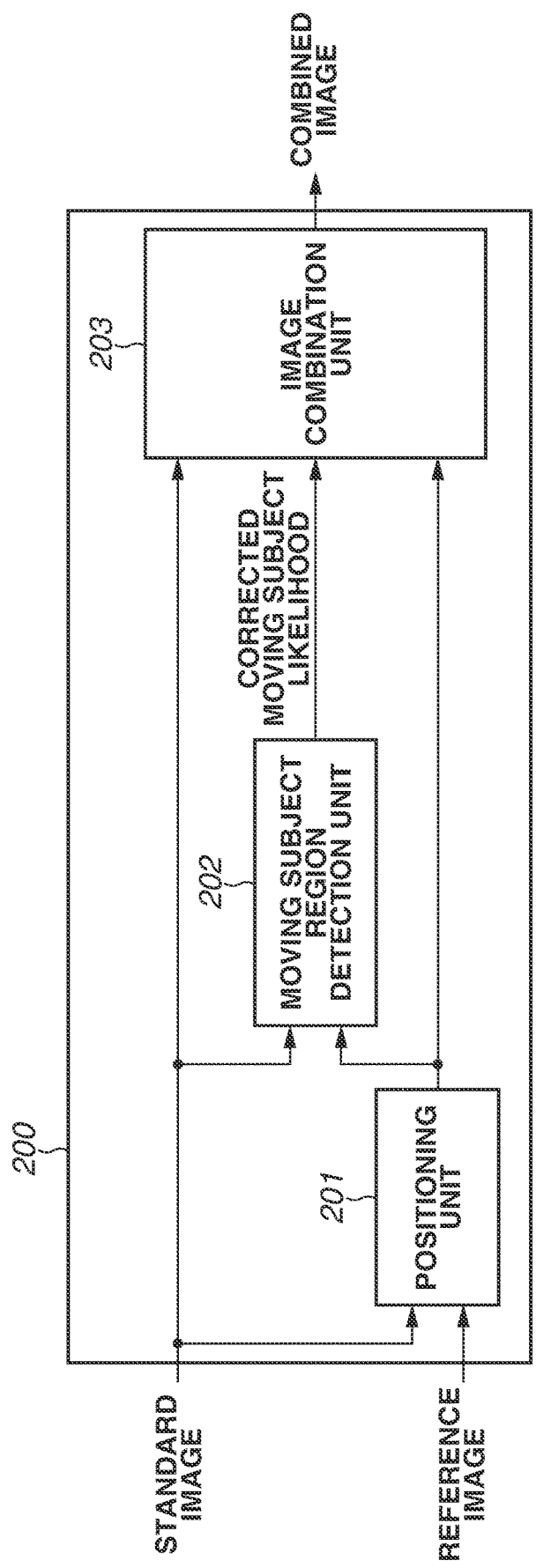
FIG. 2 illustrates an example configuration of a combined image generation unit.

The image processing unit 107 includes the combined image generation unit 200 as illustrated in FIG. 2.

The combined image generation unit 200 is a component included in the combination function of combining data of two images stored in the RAM 103, to generate a combined image. The combined image generation unit 200 includes a positioning unit 201, a moving subject region detection unit 202, and an image combination unit 203, as illustrated in FIG. 2. Image data and various information indicating values such as the moving subject likelihood (described below) are transmitted between the above-described units illustrated in FIG. 2. Hereinafter, descriptions of these pieces of data and information will be omitted for simplification. This also applies to descriptions of drawings indicating other configurations (described below).

Processing performed by the imaging apparatus 100 illustrated in FIG. 1 and the combined image generation unit 200 (in the image processing unit 107) illustrated in FIG. 2 will be described below with reference to the flowchart illustrated in FIG. 3. This also applies to other flowcharts (described below).

Figure 3:
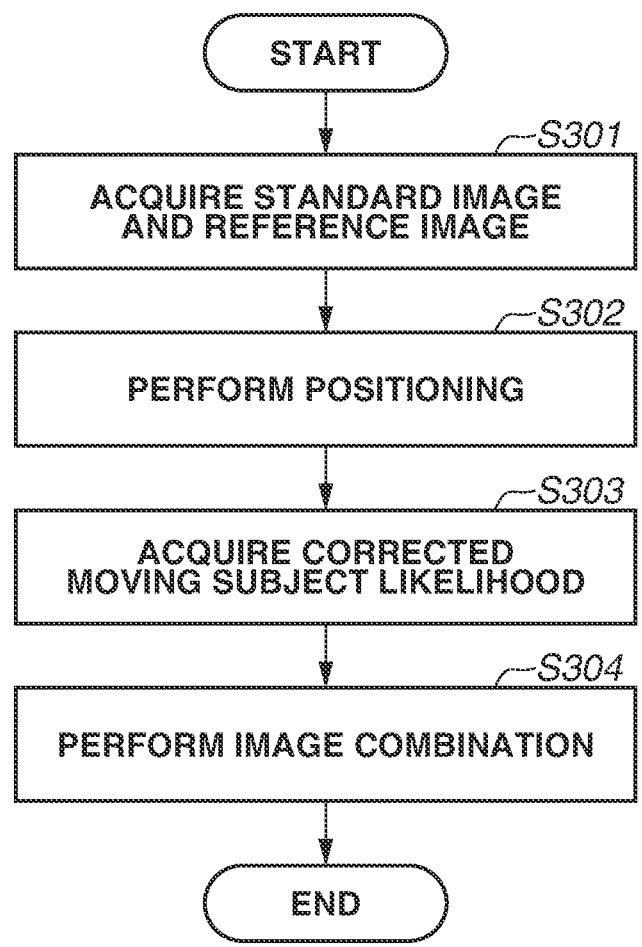
FIG. 3 is a flowchart illustrating a processing flow of the combined image generation unit.

Referring to FIG. 3, in step S301, the control unit 101 of the imaging apparatus 100 illustrated in FIG. 1 selects and acquires a standard image and a reference image to be combined with the standard image, out of a plurality of images stored in the RAM 103. For example, the control unit 101 acquires as a standard image the first image captured immediately after pressing the shutter button and acquires the second and subsequent images as reference images during image capturing. Then, the control unit 101 transmits the standard image and the reference image acquired from the RAM 103 in step S301, to the image processing unit 107.

In step S302, the positioning unit 201 performs positioning processing for aligning the position of the reference image with the position of the standard image. More specifically, the positioning unit 201 detects a moving vector between the standard image and the reference image acquired in step S301 and performs geometric deformation on the reference image based on the motion vector.

Figure 4A:
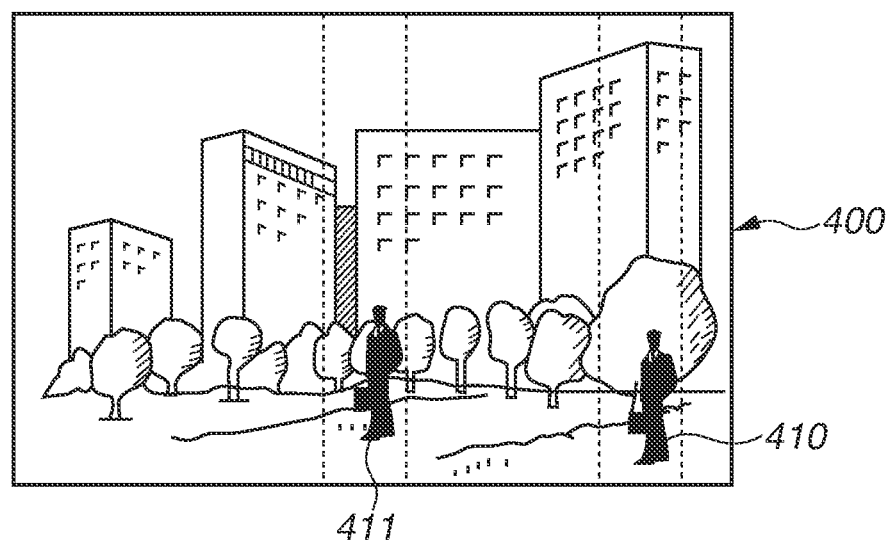
FIGS. 4A, 4B, and 4C illustrate examples of a standard image, a reference image, and a positioned reference image, respectively.

The positioning processing will be described below with reference to FIGS. 4A to 4C. FIG. 4A illustrates a standard image 400, FIG. 4B illustrates a reference image 401, and FIG. 4C illustrates a positioned reference image 402 having undergone the positioning processing.

Figure 4B:
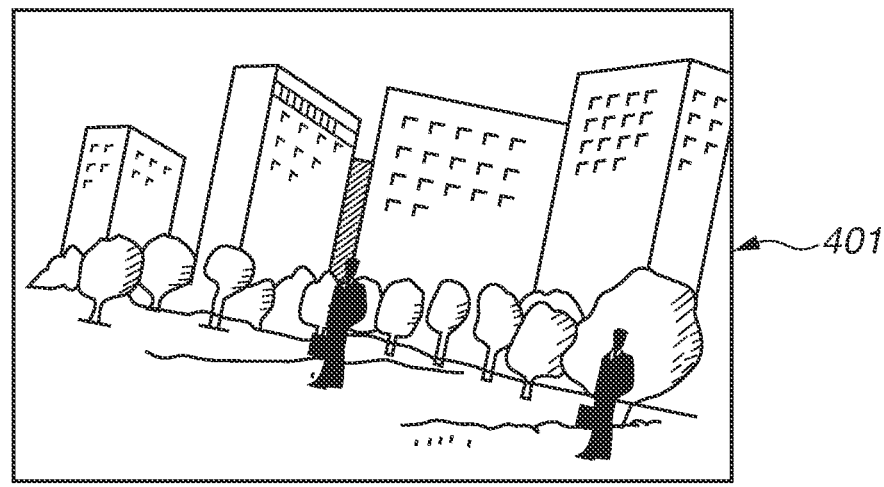

The reference image 401 illustrated in FIG. 4B is an image captured at different times from the standard image 400 illustrated in FIG. 4A. For example, in the reference image 401, positions and inclinations are deviated with respect those in the standard image 400 illustrated in FIG. 4A due to camera shake during image capturing. The positioning unit 201 corrects such deviations of positions and inclinations through the positioning processing. The positioning unit 201 first detects a motion vector indicating an overall motion between the standard image 400 illustrated in FIG. 4A and the reference image 401 illustrated in FIG. 4B. Examples of motion vector detection methods include the block matching method. Then, the positioning unit 201 calculates a geometric conversion factor A represented by formula (1) as a coefficient for performing geometric conversion on the reference image 401 based on the detected motion vector.

$$A = \begin{pmatrix} a & b & c \\ d & e & f \\ g & h & i \end{pmatrix} \quad \text{Formula (1)}$$

Figure 4C:
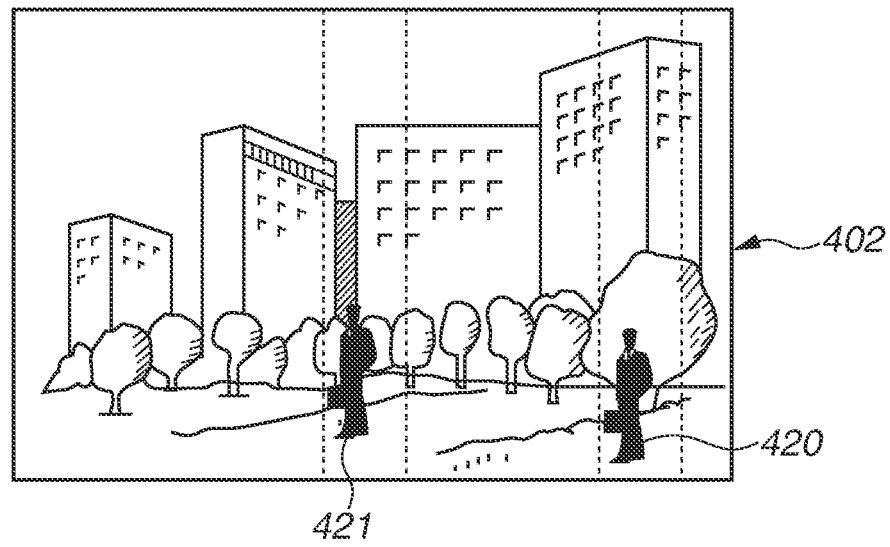

By using the geometric conversion factor A, the positioning unit 201 performs geometric deformation calculations represented by formula (2) for the reference image 401 illustrated in FIG. 4B to generate the positioned reference image 402 illustrated in FIG. 4C. Referring to formula (2), the reference image 401 is denoted by (x-coordinate, y-coordinate), and the positioned reference image 402 is denoted by I' (x'-coordinate, y'-coordinate).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{Formula (2)}$$

The positioning unit 201 performs such processing for adjusting positions and inclinations to allow adjusting the positions and inclinations of stationary subjects (for example, buildings and trees) between the standard image 400 and the reference image 401, as in the positioned reference image 402 illustrated in FIG. 4C.

Referring back to the flowchart in FIG. 3, in step S303, the moving subject region detection unit 202 compares the standard image 400 and the positioned reference image 402 to detect a moving region in the images. The moving subject region detection unit 202 further obtains the moving subject likelihood for each of predetermined regions (for example, for each pixel) in the detected moving region based on the standard image 400 and the positioned reference image 402. According to the present embodiment, a moving region is represented by multi-value data representing the likelihood of being a moving subject (i.e., moving subject likelihood). According to the present embodiment, in the detected moving region and a region neighboring the moving region, a pixel having a moving subject likelihood value of 100 or more is regarded as a pixel of a moving subject region, and a pixel having a moving subject likelihood value of 0 is regarded as a pixel of a stationary region which is not a moving subject. The larger the moving subject likelihood value of a pixel is with respect to 0, the more the pixel is likely to be included in a moving subject region. The moving subject region detection unit 202 according to the present embodiment corrects the detected moving subject likelihood (described below) to generate the corrected moving subject likelihood. The detailed configuration, the moving subject likelihood generation processing, and the corrected moving subject likelihood generation processing of the moving subject region detection unit 202 will be described below.

In step S304, as represented by the following formula (3), the image combination unit 203 sets the combination ratio based on the corrected moving subject likelihood and, based on the combination ratio, combines the standard image 400 with the positioned reference image 402 for each pixel to generate a combined image.

$$P = w*P\text{base} + (1-w)*P\text{ref} \quad \text{Formula (3)}$$

Referring to formula (3), Pbase denotes the pixel value of the standard image 400, Pref denotes the pixel value of the positioned reference image 402, w denotes the combination ratio of the standard image 400, and P denotes the pixel value of the combined image.

Figure 5:
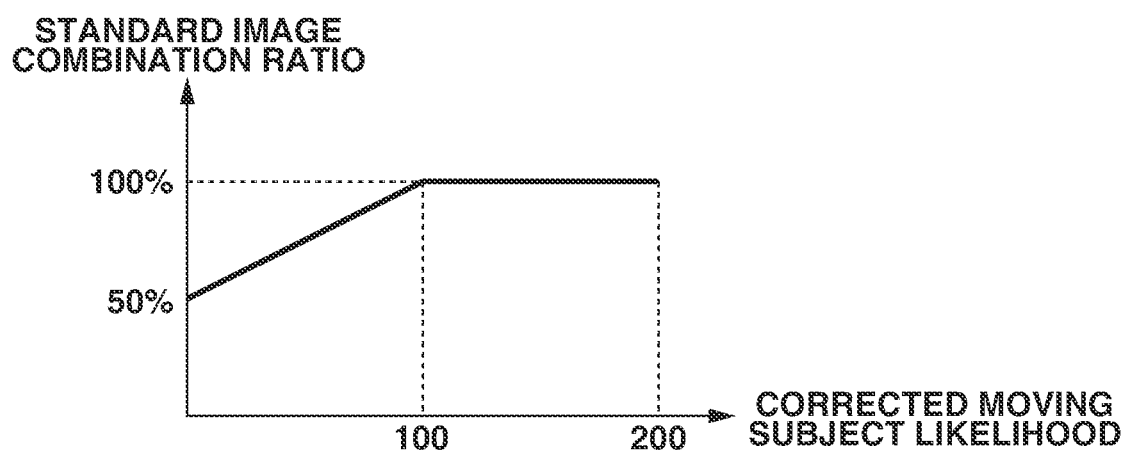
FIG. 5 illustrates a combination ratio curve of the standard image.

The combination ratio setting processing based on the corrected moving subject likelihood will be described below with reference to FIG. 5. FIG. 5 illustrates a combination ratio curve representing the relation between the corrected moving subject likelihood and the combination ratio of the standard image 400. Referring to FIG. 5, the vertical axis indicates the combination ratio of the standard image 400, and the horizontal axis indicates the corrected moving subject likelihood. The combination ratio curve illustrated in FIG. 5 is set so that the combination ratio of the standard image 400 increases with increasing corrected moving subject likelihood.

According to the combination ratio curve illustrated in FIG. 5, in a moving subject region where the value of the corrected moving subject likelihood is 100 or more, the combination ratio of the standard image 400 is set to 100%. Reference image combination processing is inhibited for that moving subject region. This restricts the generation of multiple images. On the other hand, in a stationary region where the value of the corrected moving subject likelihood is 0, the combination ratio of the standard image 400 is set to 50%. The stationary region of the reference image 401 is combined with the standard image 400 with a combination ratio of 50%. In this case, the combination of the reference image 401 reduces random noise.

Figure 6:
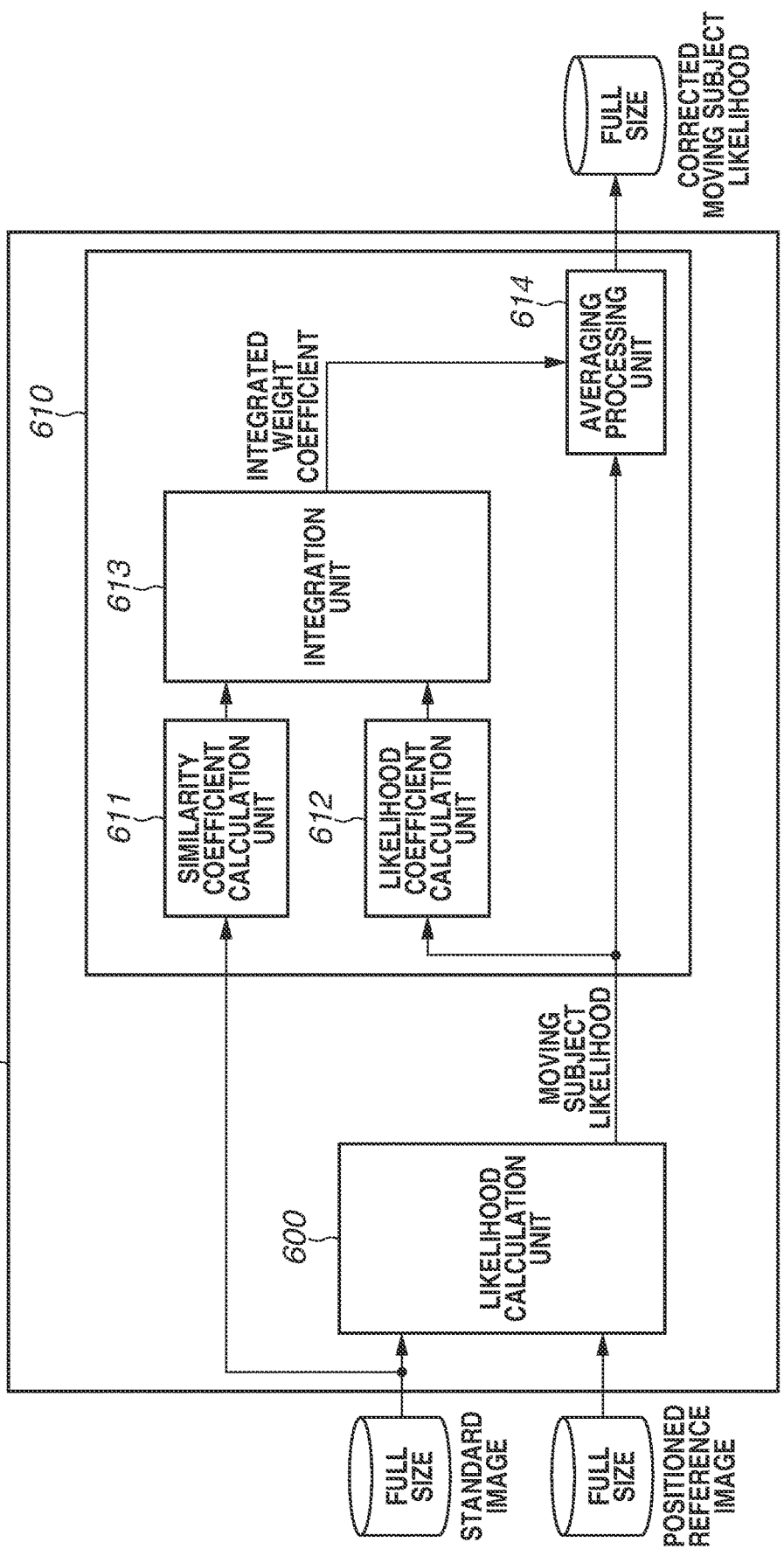
FIG. 6 illustrates an example configuration of a moving subject region detection unit according to a first embodiment.

The detailed configuration, the moving subject likelihood generation processing, and the corrected moving subject likelihood generation processing of the moving subject region detection unit 202 according to the first embodiment will be described below with reference to FIG. 6.

The moving subject region detection unit 202 calculates the moving subject likelihood based on the interframe difference absolute value between the frame of the standard image 400 and the frame of the positioned reference image 402, corrects the moving subject likelihood, and generates the corrected moving subject likelihood. As illustrated in FIG. 6, the moving subject region detection unit 202 includes a likelihood calculation unit 600 and a likelihood correction unit 610. The likelihood correction unit 610 includes a similarity coefficient calculation unit 611, a likelihood coefficient calculation unit 612, an integration unit 613, and an averaging processing unit 614.

The standard image 400 and the positioned reference image 402 read from the above-described RAM 103 illustrated in FIG. 1 are input to the likelihood calculation unit 600. The standard image 400 and the positioned reference image 402 input to the likelihood calculation unit 600 are images having the resolution when captured by the imaging apparatus 100 (hereinafter referred to as an resolution at a timing of imaging) and are images not having undergone the reduction processing (resolution conversion to low resolution). Hereinafter, the resolution at a timing of imaging is referred to as the full size. The likelihood calculation unit 600 calculates for each pixel the difference absolute value between the frame of the full-size standard image and the frame of the full-size positioned reference image and generates the moving subject likelihood for each pixel based on the difference absolute value between the frames for each pixel. The moving subject likelihood generation processing based on the interframe difference absolute value will be described in detail below. The moving subject likelihood for each pixel calculated by the likelihood calculation unit 600 is transmitted to the likelihood coefficient calculation unit 612 and the averaging processing unit 614 of the likelihood correction unit 610.

The full-size standard image 400 read from the RAM 103 illustrated in FIG. 1 is input to the similarity coefficient calculation unit 611 of the likelihood correction unit 610. The similarity coefficient calculation unit 611 detects the similarity of each pixel value of each peripheral region to a target region including at least one pixel, i.e., the similarity of each peripheral coordinate to the target coordinate, by using the pixel value of each pixel of the standard image 400, and acquires the similarity weight coefficient according to the similarity of these peripheral coordinates. The similarity detection processing and the similarity weight coefficient acquisition processing will be described in detail below. The similarity weight coefficient for each peripheral coordinate obtained by the similarity coefficient calculation unit 611 is transmitted to the integration unit 613.

The likelihood coefficient calculation unit 612 acquires the moving subject likelihood weight coefficient for each peripheral coordinate based on the moving subject likelihood in each peripheral region for the target region, i.e., the moving subject likelihood of each peripheral coordinate for the target coordinate from among the moving subject likelihood calculated for each pixel by the likelihood calculation unit 600. The moving subject likelihood weight coefficient acquisition processing will be described in detail below. The moving subject likelihood weight coefficient of each peripheral coordinate obtained by the likelihood coefficient calculation unit 612 is transmitted to the integration unit 613.

The integration unit 613 acquires the integrated weight coefficient for each peripheral coordinate based on the similarity weight coefficient for each peripheral coordinate obtained by the similarity coefficient calculation unit 611 and the moving subject likelihood weight coefficient for each peripheral coordinate obtained by the likelihood coefficient calculation unit 612. The integrated weight coefficient acquisition processing will be described in detail below. The integrated weight coefficient acquired by the integration unit 613 is transmitted to the averaging processing unit 614.

The averaging processing unit 614 generates the corrected moving subject likelihood by performing weighted addition averaging processing on the moving subject likelihoods of the target and peripheral coordinates based on the moving subject likelihood for each pixel obtained by the likelihood calculation unit 600 and the integrated weight coefficient calculated by the integration unit 613.

The moving subject likelihood generation processing and the corrected moving subject likelihood generation processing performed by the moving subject region detection unit 202 illustrated in FIG. 6 will be described below with reference to the flowchart illustrated in FIG. 7.

Figure 7:
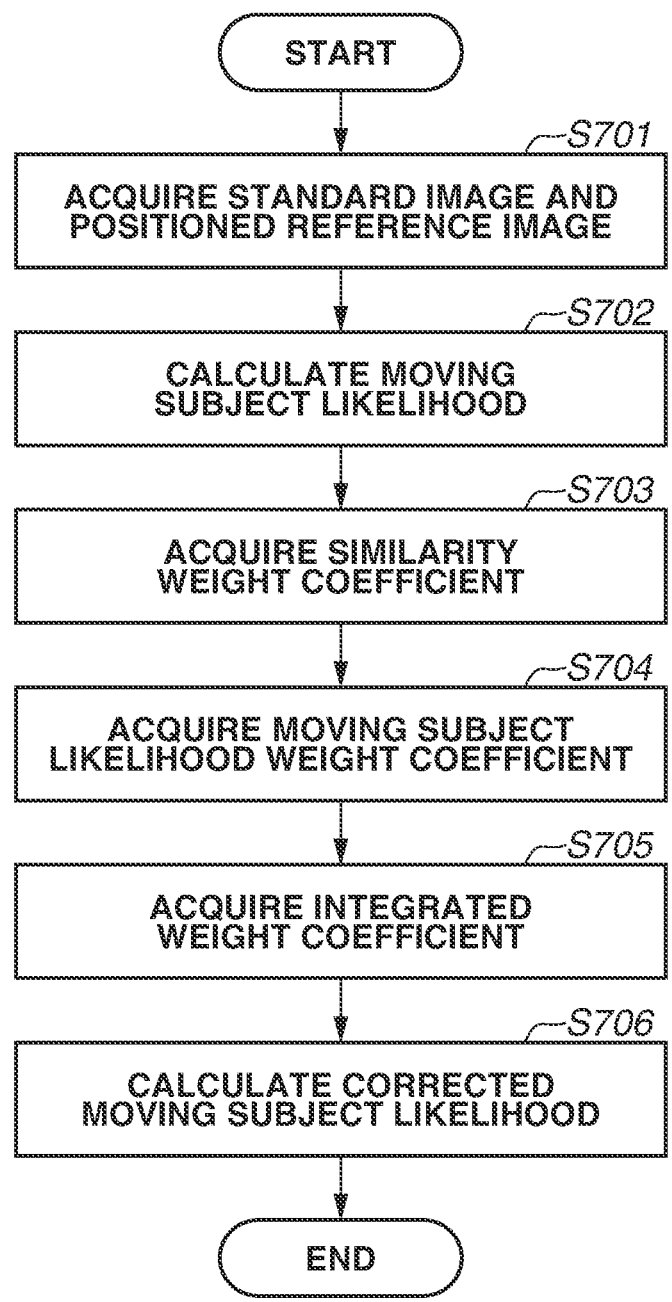
FIG. 7 is a flowchart illustrating processing of the moving subject region detection unit according to the first embodiment.

Referring to FIG. 7, in step S701, the likelihood calculation unit 600 of the moving subject region detection unit 202 acquires the standard image 400 and the positioned reference image 402. Descriptions will be made centering on the standard image 400 illustrated in FIG. 4A and the positioned reference image 402 illustrated in FIG. 4C. As described above, since the standard image 400 illustrated in FIG. 4A and the positioned reference image 402 illustrated in FIG. 4C are images captured at different times, the position of a subject which has moved during image capturing may be different between the two images. For example, a person 410 in the standard image 400 illustrated in FIG. 4A has moved to a different position of a person 420 in the positioned reference image 402 illustrated in FIG. 4C. Likewise, a person 411 in the standard image 400 has moved to a different position of a person 421 in the positioned reference image 402. The likelihood calculation unit 600 compares the standard image 400 with the positioned reference image 402 to detect a region where each person has moved in the images, as a moving region.

Figure 8:
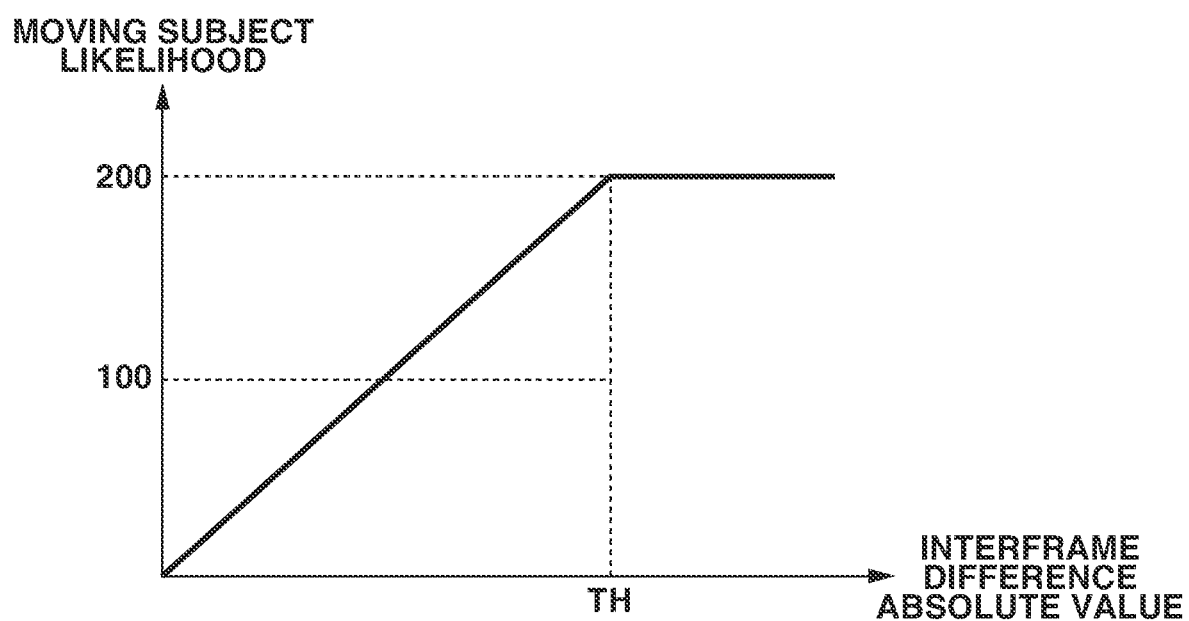
FIG. 8 illustrates a moving subject likelihood curve.

In step S702, the likelihood calculation unit 600 calculates the interframe difference absolute value between the frame of the standard image 400 and the frame of the positioned reference image 402 for each pixel and obtains the moving subject likelihood for each pixel based on the moving subject likelihood curve illustrated in FIG. 8.

FIG. 8 illustrates the moving subject likelihood curve representing the relation between the interframe difference absolute value and the moving subject likelihood. The vertical axis denotes the moving subject likelihood, and the horizontal axis denotes the interframe difference absolute value. According to the present embodiment, a moving subject likelihood curve is set so that the moving subject likelihood increases with increasing interframe difference absolute value. With the moving subject likelihood curve illustrated in FIG. 8, the moving subject likelihood is represented by a value from 0 to 200, i.e., the maximum value of the moving subject likelihood is 200. When the interframe difference absolute value is less than a threshold value (a threshold value TH), for example, the value of the moving subject likelihood linearly changes between 100 and 200. When the interframe difference absolute value is the threshold value (the threshold value TH) or more, the value of the moving subject likelihood is fixed to 200. According to the present embodiment, the magnitude of the value of the moving subject likelihood is set as illustrated in FIG. 8 due to the reason illustrated in FIG. 5. More specifically, the combination ratio curve illustrated in FIG. 5 is set so that, when the value of the corrected moving subject likelihood is 100, the combination ratio of the standard image 400 is 100%. This means that, when the value of the corrected moving subject likelihood is 100 or more, the combination of the moving subject region of the reference image 401 with the standard image 400 is inhibited. On the other hand, as described above, the combination ratio of the standard image 400 is set to 50% when the value of the corrected moving subject likelihood is 0. This setting is intended to combine a stationary region of the reference image 401 with the standard image 400 with a combination ratio of 50%. To perform the processing for combining the standard image 400 with the moving subject region of the reference image 401 based on the combination ratio curve illustrated in FIG. 5, the magnitudes of the values of the moving subject likelihood and the corrected moving subject likelihood are set based on the moving subject likelihood curve illustrated in FIG. 8.

Referring back to the flowchart in FIG. 7, in step S703, by using the pixel value at each pixel coordinate of the standard image 400, the similarity coefficient calculation unit 611 detects the similarity of each peripheral coordinate to the target coordinate and acquires the similarity weight coefficient according to the similarity for each peripheral coordinate.

Figure 9A:
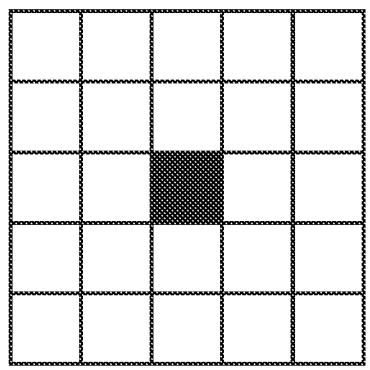
FIGS. 9A and 9B illustrate similarity weight coefficient calculation processing.
Figure 9B:
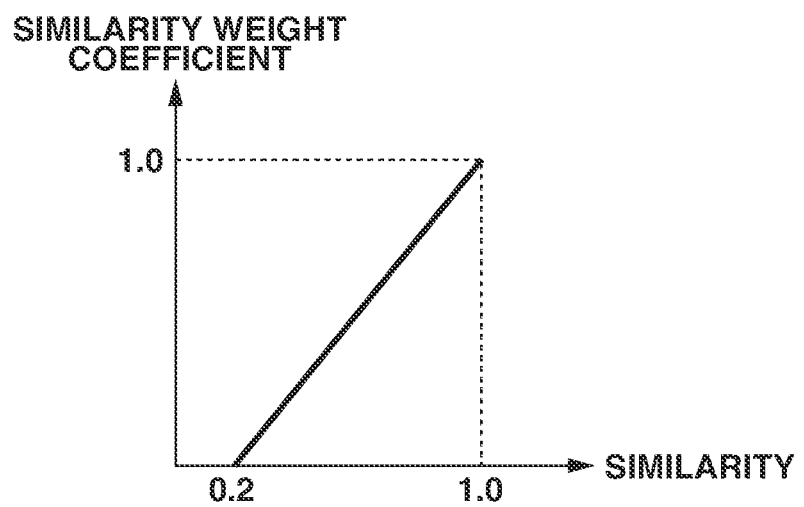

The similarity detection processing and the similarity weight coefficient acquisition processing will be described below with reference to FIGS. 9A and 9B. FIG. 9A illustrates a positional relationship between pixels used for the similarity detection. Each small square in FIG. 9A indicates one pixel. Referring to FIG. 9A, the pixel at the black coordinate represents the pixel at the target coordinate, and a pixel at the white coordinate represents each pixel at the peripheral coordinate. FIG. 9B illustrates a similarity weight coefficient curve used when converting the similarity into the similarity weight coefficient. The vertical axis denotes the similarity weight coefficient and the horizontal axis denotes the similarity.

Based on the calculation represented by formula (4), the similarity coefficient calculation unit 611 first calculates the difference absolute value between the pixel value at the target coordinate and the pixel value at the peripheral coordinate for each pixel and, based on the difference absolute value for each pixel, calculates a similarity Si of each pixel at each peripheral coordinate to the pixel at the target coordinate illustrated in FIG. 9A. The similarity refers to an evaluation value which indicates the similarity between the pixel value at the target coordinate and the pixel value at the peripheral coordinate.

$$Si=1/(|Yc-Ysi|+|Uc-Usi|+|Vc-Vsi|) \quad \text{Formula (4)}$$

Referring to formula (4), Yc denotes the luminance value of the pixel at the target coordinate, and Uc and Vc denote the color difference values of the pixel at the target coordinate, Ysi denotes the luminance value of the pixel at the peripheral coordinate, and Usi and Vsi denote the color difference values of the pixel at the peripheral coordinate. More specifically, the similarity Si decreases with increasing difference absolute value between the pixel value at the target coordinate and the pixel value at the peripheral coordinate and increases with decreasing difference absolute value. When the denominator of the formula (4) is 0, i.e., when the difference absolute value between the pixel value at the target coordinate and the pixel value at the peripheral coordinate is 0, the similarity Si is set to 1.0.

Then, the similarity coefficient calculation unit 611 acquires the similarity weight coefficient based on the similarity calculated for each peripheral coordinate and the similarity weight coefficient curve illustrated in FIG. 9B. In the example setting of the similarity weight coefficient curve illustrated in FIG. 9B, the similarity weight coefficient increases with increasing similarity. In the similarity weight coefficient curve illustrated in FIG. 9B, the similarity weight coefficient is represented by a value from 0.0 to 1.0, i.e., the maximum value of the similarity weight coefficient is 1.0. In the example of the similarity weight coefficient curve illustrated in FIG. 9B, the value of the similarity weight coefficient is set to 0 when the similarity is less than 0.2. This setting is intended to exclude the moving subject likelihood of the peripheral coordinate with a low similarity to allow only the moving subject likelihood of the peripheral coordinate with a high similarity to be subjected to the weighted addition averaging processing (described below), thus preventing the increase in the moving subject likelihood of stationary subjects around the moving subject.

For example, in the case of the person 411 in the standard image 400 illustrated in FIG. 4A, the detection result is correct if the region of the person 411 is detected as a moving subject region. However, when the moving subject likelihood is corrected, the moving subject likelihood of trees and buildings, which are stationary subjects existing in the peripheral region of the person 411, may also possibly increase. Therefore, in the similarity weight coefficient curve illustrated in FIG. 9B, the similarity weight coefficient is set to 0 when the similarity is less than 0.2. This setting is intended to allow only the moving subject likelihood of the peripheral coordinate with a high similarity to be subjected to the weighted addition averaging processing. This makes it easier to perform moving subject likelihood correction by using the moving subject likelihood of the same subject having similar pixel values, preventing the increase in the moving subject likelihood of stationary subjects around the moving subject.

Figure 10:
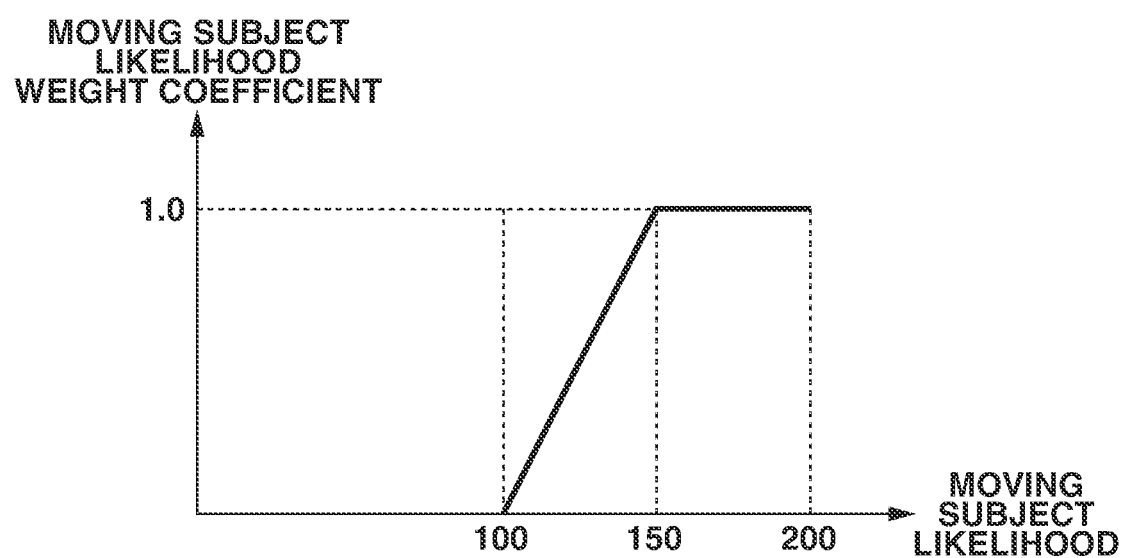
FIG. 10 illustrates moving subject likelihood weight coefficient acquisition processing.

Referring back to the flowchart in FIG. 7, in step S704, the likelihood coefficient calculation unit 612 acquires the moving subject likelihood weight coefficient for each peripheral coordinate based on the moving subject likelihood calculated by the likelihood calculation unit 600 and the moving subject likelihood weight coefficient curve illustrated in FIG. 10. In the example setting of the moving subject likelihood weight coefficient curve illustrated in FIG. 10, the moving subject likelihood weight coefficient increases with increasing moving subject likelihood. The vertical axis denotes the moving subject likelihood weight coefficient, and the horizontal axis denotes the moving subject likelihood. In the moving subject likelihood weight coefficient curve illustrated in FIG. 10, the weight coefficient is represented by a value from 0.0 to 1.0, i.e., the maximum value of the moving subject likelihood weight coefficient is 1.0. When the moving subject likelihood is 150 or more, the moving subject likelihood weight coefficient is set to 1.0. When the moving subject likelihood is less than 100, the moving subject likelihood weight coefficient is set to 0.0. When the moving subject likelihood is between 100 and 150, for example, the moving subject likelihood weight coefficient linearly changes.

As described in step S702, when the value of the corrected moving subject likelihood is 100 or more, the combination ratio of the standard image becomes 100%, and the combination of the moving subject region of the reference image 401 is inhibited. In the example setting of the moving subject likelihood weight coefficient curve illustrated in FIG. 10, the weight coefficient is larger than 0.0 when the moving subject likelihood is 100 or more. This setting is intended to allow only the moving subject likelihood of 100 or more of the peripheral coordinate to be subjected to the weighted addition averaging processing so that the moving subject likelihood less than 100 is corrected to a larger value. The combination ratio of the standard image can be increased by correcting the moving subject likelihood less than 100 to a larger value in this way. The moving subject likelihood larger than 100 may be corrected to a smaller value by subjecting only the moving subject likelihood of 100 or more of the peripheral coordinate to the weighted addition averaging processing (described below). However, the value of the corrected moving subject likelihood becomes 100 or more even if the moving subject likelihood is corrected to a smaller value. Therefore, the combination ratio of the standard image 400 becomes 100%, and the combination of the moving subject region of the reference image 401 is inhibited. More specifically, correcting the moving subject likelihood in the way according to the present embodiment expands the region to be detected as a moving subject region.

In step S705, the integration unit 613 acquires the integrated weight coefficient for each peripheral coordinate based on the above-described similarity weight coefficient for each peripheral coordinate and the above-described moving subject likelihood weight coefficient for each peripheral coordinate.

Figure 11:
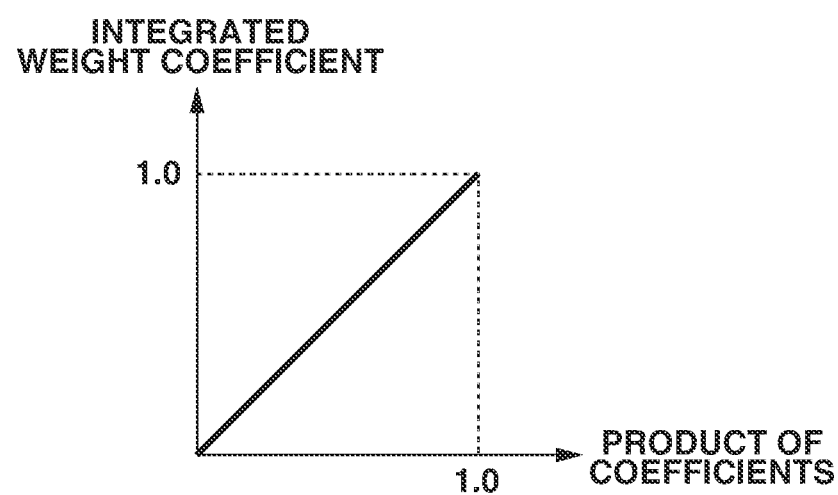
FIGS. 11A and 11B illustrate integrated weight coefficient calculation processing.

A method for acquiring the integrated weight coefficient of the peripheral coordinate will be described below with reference to FIGS. 11A and 11B. FIG. 11A illustrates an integrated weight coefficient curve representing the relation between the product of the similarity weight coefficient and the moving subject likelihood weight coefficient, and the integrated weight coefficient. The vertical axis denotes the integrated weight coefficient and the horizontal axis denotes the product of the two coefficients. FIG. 11B illustrates an example of the value of the integrated weight coefficient for each coordinate corresponding to the target and peripheral coordinates illustrated in FIG. 9A.

The integration unit 613 calculates the product of the similarity weight coefficient and the moving subject likelihood weight coefficient of the peripheral coordinate and, based on the integrated weight coefficient curve illustrated in FIG. 11A, acquires the integrated weight coefficient illustrated in FIG. 11B for each peripheral coordinate. In the example setting of the integrated weight coefficient curve illustrated in FIG. 11A, the integrated weight coefficient increases with increasing product of the similarity weight coefficient and the moving subject likelihood weight coefficient. In the integrated weight coefficient curve illustrated in FIG. 11A, the weight coefficient is represented by a value from 0.0 to 1.0, i.e., the maximum value of the integrated weight coefficient is 1.0. For example, when the similarity weight coefficient is 1.0 and the moving subject likelihood weight coefficient is 1.0, the product of these coefficients becomes 1.0, and the integrated weight coefficient acquired from the integrated weight coefficient curve illustrated in FIG. 11A becomes 1.0. When either one of the similarity weight coefficient and the moving subject likelihood weight coefficients is 0, the product of these coefficients becomes 0, and the integrated weight coefficient becomes 0.0. More specifically, the integration unit 613 sets the integrated weight coefficient of the peripheral coordinate having a high similarity and a high moving subject likelihood to a large value.

By acquiring the integrated weight coefficient as described above, the integration unit 613 can correct the moving subject likelihood of the target coordinate having a similar pixel value to the peripheral coordinate and a high moving subject likelihood of the peripheral coordinate, to a large value. This makes it easier to detect, as a moving subject region, the region of a moving subject which had been unable to be correctly detected as a moving subject region due to the low moving subject likelihood. In the meantime, the moving subject likelihood of the target coordinate not having a similar pixel value to the peripheral coordinate will not be corrected. This allows preventing the moving subject likelihood of a stationary region around the moving subject from being corrected to a large value. The moving subject likelihood of the target coordinates having a low moving subject likelihood of the peripheral coordinate is not corrected. This allows preventing the moving subject likelihood which has been changed to approximately 30 by the influence of random noise occurring in a stationary region, from being corrected to a large value.

The integrated weight coefficient acquisition processing for the target coordinate will be described below with reference to FIG. 11B.

The integration unit 613 sets the integrated weight coefficient of the target coordinate to 1.0 as the maximum value, as illustrated in FIG. 11B, and sets the integrated weight coefficient of the peripheral coordinate to the integrated weight coefficient acquired in the above-described processing.

The integrated weight coefficient of the target coordinates is not limited to 1.0. For example, setting the integrated weight coefficient of target coordinates to a value less than 1.0 allows performing the moving subject likelihood correction with the moving subject likelihood of the peripheral coordinate emphasized.

Then, in step S705 illustrated in FIG. 7, the averaging processing unit 614 performs the weighted addition averaging processing on the moving subject likelihoods of the target and peripheral coordinates based on the integrated weight coefficient to generate the corrected moving subject likelihood. More specifically, the averaging processing unit 614 performs the product-sum operation on the pixel values of the target and peripheral coordinates with the integrated weight coefficient and then divides the product by the sum total of the integrated weight coefficients to calculate the corrected moving subject likelihood.

The moving subject likelihood weight coefficient curve may be changed according to the sensitivity information during image capturing. For example, in the case where the sensitivity is high during image capturing, the amplitude of random noise of the standard image 400 and the reference image 401 increases, and accordingly the moving subject likelihood tends to increase due to the random noise. For this reason, the moving subject likelihood weight coefficient may be changed according to the noise amount. For example, in the case where the sensitivity is high accompanied by a large noise amount, it is desirable to decrease the moving subject likelihood weight coefficient in comparison with the case of the low sensitivity during image capturing. More specifically, in the case where the sensitivity is high during image capturing, the averaging processing unit 614 decreases the moving subject likelihood weight coefficient. More specifically, the averaging processing unit 614 decreases the slope of the moving subject likelihood weight coefficient curve or increases the x-intercept according to the noise amount in comparison with the case of the moving subject likelihood weight coefficient curve illustrated in FIG. 10.

Although, in the example according the above-described embodiment, the integrated weight coefficient is a multivalued number from 0.0 to 1.0, the integrated weight coefficient may be a binary, for example, 0.0 and 1.0. This eliminates the need of the weight coefficient multiplication processing by the averaging processing unit 614 and allows reducing the amount of processing.

Although, in the example according to the above-described embodiment, one pixel is used as the pixel of the target region, the moving subject likelihood may be corrected by using a plurality of pixels as the target region. In this case, the similarity coefficient calculation unit 611 calculates the similarity based on the difference absolute value between the average pixel value of a plurality of pixels in the target region and the pixel value of the peripheral region.

Although, in the example according to the above-described embodiment, the image combination based on the above-described corrected moving subject likelihood is applied in the combination function of combining a plurality of images to reduce random noise, an example application of the image combination based on the corrected moving subject likelihood is not limited thereto. For example, by combining a plurality of images captured with different exposures, the above-described image combination may be applied to a high dynamic range (HDR) combination function for extending the dynamic range. In this case, when images after adjusting the brightness levels of the standard image 400 and the positioned reference image 402 captured with different exposures are input to the above-described moving subject region detection unit 202, the moving subject region detection unit 202 calculates the corrected moving subject likelihood and performs the image combination based on that corrected moving subject likelihood.

As described above, when detecting a moving subject region between a plurality of images, the image processing apparatus according to the first embodiment corrects the moving subject likelihood of the target region based on the moving subject likelihood and the similarity of the peripheral region. The present embodiment allows improving the moving subject likelihood of a moving subject which is difficult to be distinguished from random noise, thus improving the detection accuracy of a moving subject region.

A second embodiment will be described below.

According to the first embodiment, the moving subject region detection unit 202 calculates the corrected moving subject likelihood based on the full-size standard image 400 and positioned reference image 402. On the other hand, the moving subject region detection unit 202 according to the second embodiment calculates the corrected moving subject likelihood based on the standard image 400 and the positioned reference image 402 with a resolution different from the resolution of the full-size images. The moving subject region detection unit 202 according to the second embodiment sets a plurality of resolutions as resolutions different from the resolution of the full-size images and performs hierarchical likelihood generation processing to calculate the moving subject likelihood based on the standard image 400 and the positioned reference image 402 for each of these resolutions. Then, the moving subject region detection unit 202 according to the second embodiment performs correction processing on the moving subject likelihood calculated for each of different resolutions and, based on the corrected moving subject likelihood, combines a plurality of images to generate a combined image. In the following descriptions, the moving subject likelihood calculated and corrected for each of different resolutions is referred to as a hierarchically corrected moving subject likelihood.

The moving subject region detection unit 202 according to the second embodiment calculates the hierarchically corrected moving subject likelihood to prevent a stationary region around the moving subject from being incorrectly detected as a moving subject region and prevent random noise from being incorrectly detected as a moving subject region. This allows more accurate detection of the moving subject as a moving subject region.

The imaging apparatus as an example application of the image processing apparatus according to the second embodiment has a similar configuration to the above-described image processing apparatus illustrated in FIG. 1, and therefore redundant illustration and descriptions thereof will be omitted. The configuration and operations of the moving subject region detection unit 202 illustrated in FIG. 2 according to the second embodiment are different from those according to the first embodiment. In the second embodiment, operations and processing identical to those in the first embodiment are assigned the same reference numerals as those in the first embodiment, and detailed descriptions thereof will be omitted.

Figure 12:
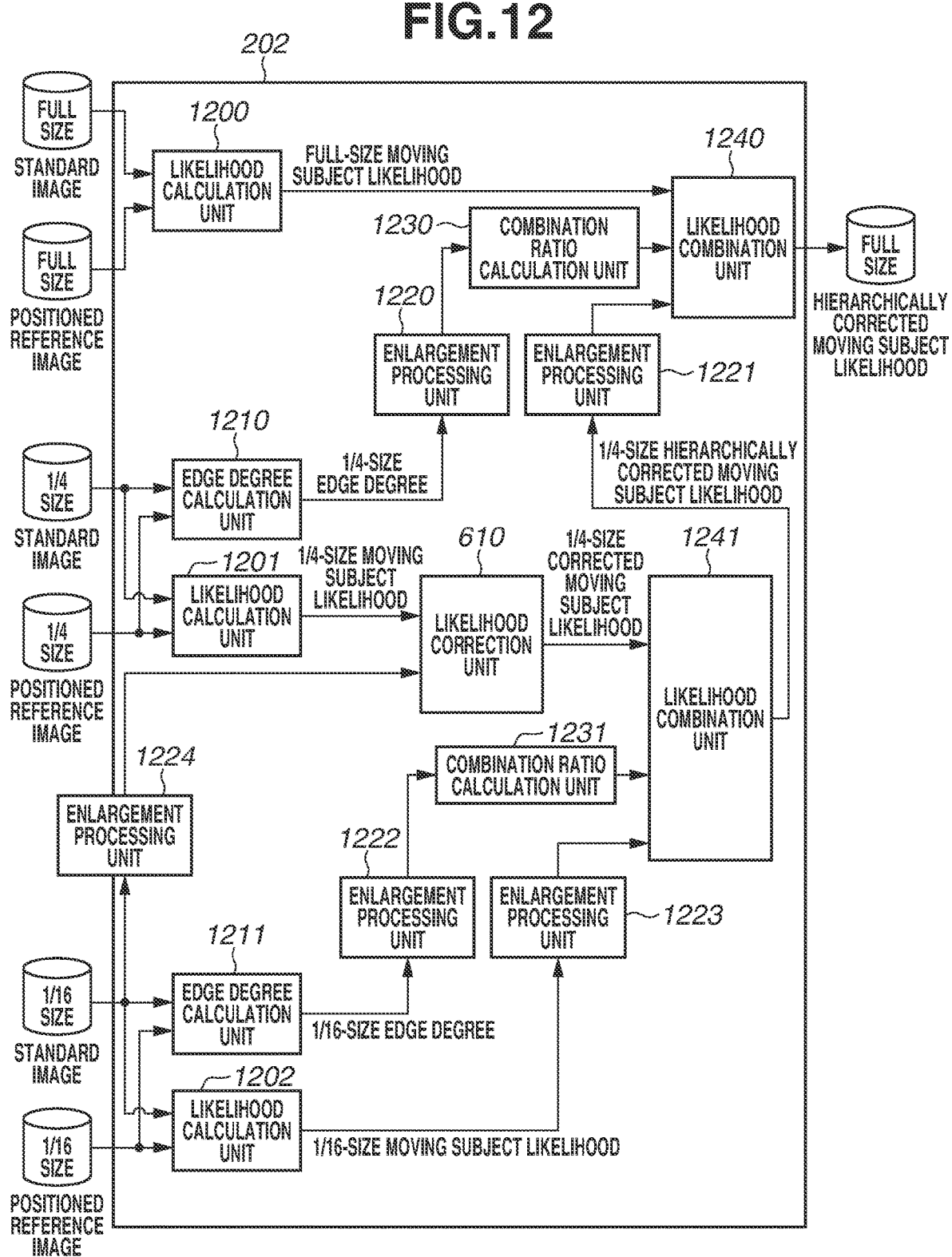
FIG. 12 illustrates an example configuration of a moving subject region detection unit according to a second embodiment.

FIG. 12 illustrates an example configuration of the moving subject region detection unit 202 according to the second embodiment. The moving subject region detection unit 202 according to the second embodiment calculates the interframe difference absolute value between the standard image 400 and the positioned reference image 402 for each of different resolutions and, based on the interframe difference absolute value calculated for each resolution, calculates the hierarchically corrected moving subject likelihood. Therefore, the moving subject region detection unit 202 according to the second embodiment includes likelihood calculation units 1200 to 1202, edge degree calculation units 1210 and 1211, the likelihood correction unit 610, enlargement processing units 1220 to 1224, combination ratio calculation units 1230 and 1231, and likelihood combination units 1240 and 1241. The likelihood correction unit 610 illustrated in FIG. 12 has a similar configuration to the above-described likelihood correction unit 610 illustrated in FIG. 6.

The full-size standard image 400 and positioned reference image 402 similar to those according to the first embodiment are read from the RAM 103 illustrated in FIG. 1 and then input to the likelihood calculation unit 1200. Similarly to the likelihood calculation unit 600 illustrated in FIG. 6, the likelihood calculation unit 1200 calculates the difference absolute value between the frame of the standard image 400 and the frame of the positioned reference image 402 for each pixel, and calculates the moving subject likelihood for each pixel based on the difference absolute value between the frames for each pixel. According to the present embodiment, the moving subject likelihood obtained by the likelihood calculation unit 1200 is referred to as a full-size moving subject likelihood. The full-size moving subject likelihood output from the likelihood calculation unit 1200 is transmitted to the likelihood combination unit 1240.

A ¼-size standard image and a ¼-size positioned reference image having the ¼ resolution converted from the standard image 400 and the positioned reference image 402 having the resolution at a timing of imaging, respectively, are input to the likelihood calculation unit 1201. For example, processing for converting the standard image 400 and the positioned reference image 402 having the resolution at a timing of imaging into the ¼ resolution is performed by a resolution converter (not illustrated), and these ¼-size images are stored in the RAM 103. The resolution converter (not illustrated) may be provided, for example, in the moving subject region detection unit 202 or formed in the control unit 101 illustrated in FIG. 1. The likelihood calculation unit 1201 calculates the difference absolute value between the frames of the ¼-size standard image 400 and positioned reference image 402 for each pixel, and calculates the moving subject likelihood for each pixel based on the difference absolute value for each pixel. According to the present embodiment, the hierarchical moving subject likelihood obtained for a hierarchy having the ¼-size resolution by the likelihood calculation unit 1201 is referred to as a ¼-size moving subject likelihood. The ¼-size moving subject likelihood output from the likelihood calculation unit 1201 is transmitted to the likelihood correction unit 610.

A ¹⁄₁₆-size standard image and a ¹⁄₁₆-size positioned reference image having the ¹⁄₁₆ resolution converted from the standard image 400 and the positioned reference image 402 having the resolution at a timing of imaging, respectively, are input to the likelihood calculation unit 1202. Like the above-described processing, for example, processing for converting the standard image 400 and the positioned reference image 402 having the resolution at a timing of imaging into the ¹⁄₁₆ resolution is performed by a resolution converter (not illustrated), and these ¹⁄₁₆-size images are stored in the RAM 103. The likelihood calculation unit 1202 calculates the interframe difference absolute value between the ¹⁄₁₆-size standard image and positioned reference image and calculates the moving subject likelihood for each pixel based on the difference absolute value. According to the present embodiment, the hierarchical moving subject likelihood obtained for a hierarchy having the ¹⁄₁₆-size resolution by the likelihood calculation unit 1202 is referred to as a ¹⁄₁₆-size moving subject likelihood. The ¹⁄₁₆-size moving subject likelihood output from the likelihood calculation unit 1202 is transmitted to the enlargement processing unit 1223.

The ¹⁄₁₆-size standard image is enlarged into an image equivalent to the ¼ size by the enlargement processing unit 1224, and the enlarged image is transmitted to the likelihood correction unit 610.

The likelihood correction unit 610 performs similar processing to the processing according to the first embodiment based on the ¼-size-equivalent standard image enlarged from the ¹⁄₁₆-size standard image by the enlargement processing unit 1224 and the ¼-size moving subject likelihood from the likelihood calculation unit 1201. The corrected moving subject likelihood (¼-size corrected moving subject likelihood) generated by the likelihood correction unit 610 is transmitted to the likelihood combination unit 1241.

The edge degree calculation unit 1210 calculates the edge intensity for each pixel for the ¼-size standard image and positioned reference image and, based on each edge intensity calculated, acquires the edge degree (hereinafter referred to as a ¼-size edge degree) for each pixel. Likewise, the edge degree calculation unit 1211 calculates the edge intensity for each pixel for the ¹⁄₁₆-size standard image and positioned reference image and, based on each edge intensity calculated, acquires the edge degree (hereinafter referred to as a ¹⁄₁₆-size edge degree) for each pixel. The edge intensity calculation processing and the edge degree acquisition processing according to the edge intensity will be described in detail below. The ¼-size edge degree obtained by the edge degree calculation unit 1210 is transmitted to the enlargement processing unit 1220, and the ¹⁄₁₆-size edge degree obtained by the edge degree calculation unit 1211 is transmitted to the enlargement processing unit 1222.

The enlargement processing unit 1220 enlarges the ¼-size edge degree into the edge degree equivalent to the full size and transmits the enlarged edge degree to the combination ratio calculation unit 1230. Meanwhile, the enlargement processing unit 1222 enlarges the ¹⁄₁₆-size edge degree into the edge degree equivalent to the ¼ size and transmits the enlarged edge degree to the combination ratio calculation unit 1231. Meanwhile, the enlargement processing unit 1223 enlarges the ¹⁄₁₆-size moving subject likelihood into the moving subject likelihood equivalent to the ¼ size and transmits the enlarged moving subject likelihood to the likelihood combination unit 1241. Examples of enlargement processing methods performed by the above-described enlargement processing units include the bilinear enlargement method and the bicubic enlargement method.

The combination ratio calculation unit 1230 sets the combination ratio of the corrected moving subject likelihood required for the likelihood combination unit 1240 (described below) to combine a corrected moving subject likelihood, based on the full-size edge degree enlarged from the ¼-size edge degree. Meanwhile, the combination ratio calculation unit 1231 sets the combination ratio of the corrected moving subject likelihood required for the likelihood combination unit 1241 (described below) to combine a corrected moving subject likelihood, based on the ¼-size edge degree enlarged from the ¹⁄₁₆-size edge degree. The combination ratio of the corrected moving subject likelihood acquired by the combination ratio calculation unit 1230 is transmitted to the likelihood combination unit 1240, and the combination ratio of the corrected moving subject likelihood acquired by the combination ratio calculation unit 1231 is transmitted to the likelihood combination unit 1241.

The likelihood combination unit 1241 combines the moving subject likelihood from the enlargement processing unit 1223 or the corrected moving subject likelihood from the likelihood correction unit 610 based on the combination ratio of the corrected moving subject likelihood from the combination ratio calculation unit 1231. Then, the corrected moving subject likelihood resulting from the combination processing by the likelihood combination unit 1241 is transmitted to the enlargement processing unit 1221 as a ¼-size hierarchically corrected moving subject likelihood. Like the enlargement processing units, the enlargement processing unit 1221 enlarges the ¼-size hierarchically corrected moving subject likelihood into a size equivalent to the full size. Then, the hierarchically corrected moving subject likelihood resulting from the enlargement processing by the enlargement processing unit 1221 is transmitted to the likelihood combination unit 1240.

The likelihood combination unit 1240 combines the full-size moving subject likelihood from the likelihood calculation unit 1200 or the corrected moving subject likelihood from the enlargement processing unit 1221 based on the combination ratio of the corrected moving subject likelihood from the combination ratio calculation unit 1230. Then, the corrected moving subject likelihood resulting from the combination processing by the likelihood combination unit 1240 is transmitted to the image combination unit 203 illustrated in FIG. 2 according to the second embodiment as the full-size hierarchically corrected moving subject likelihood.

Like the first embodiment, the image combination unit 203 according to the second embodiment sets the combination ratio based on the full-size hierarchically corrected moving subject likelihood and, based on the combination ratio, combines the full-size standard image and positioned reference image for each pixel to generate a combined image.

The moving subject likelihood generation processing and the corrected moving subject likelihood generation processing performed by the moving subject region detection unit 202 according to the second embodiment will be described below with reference to the flowchart illustrated in FIG. 13.

Figure 13:
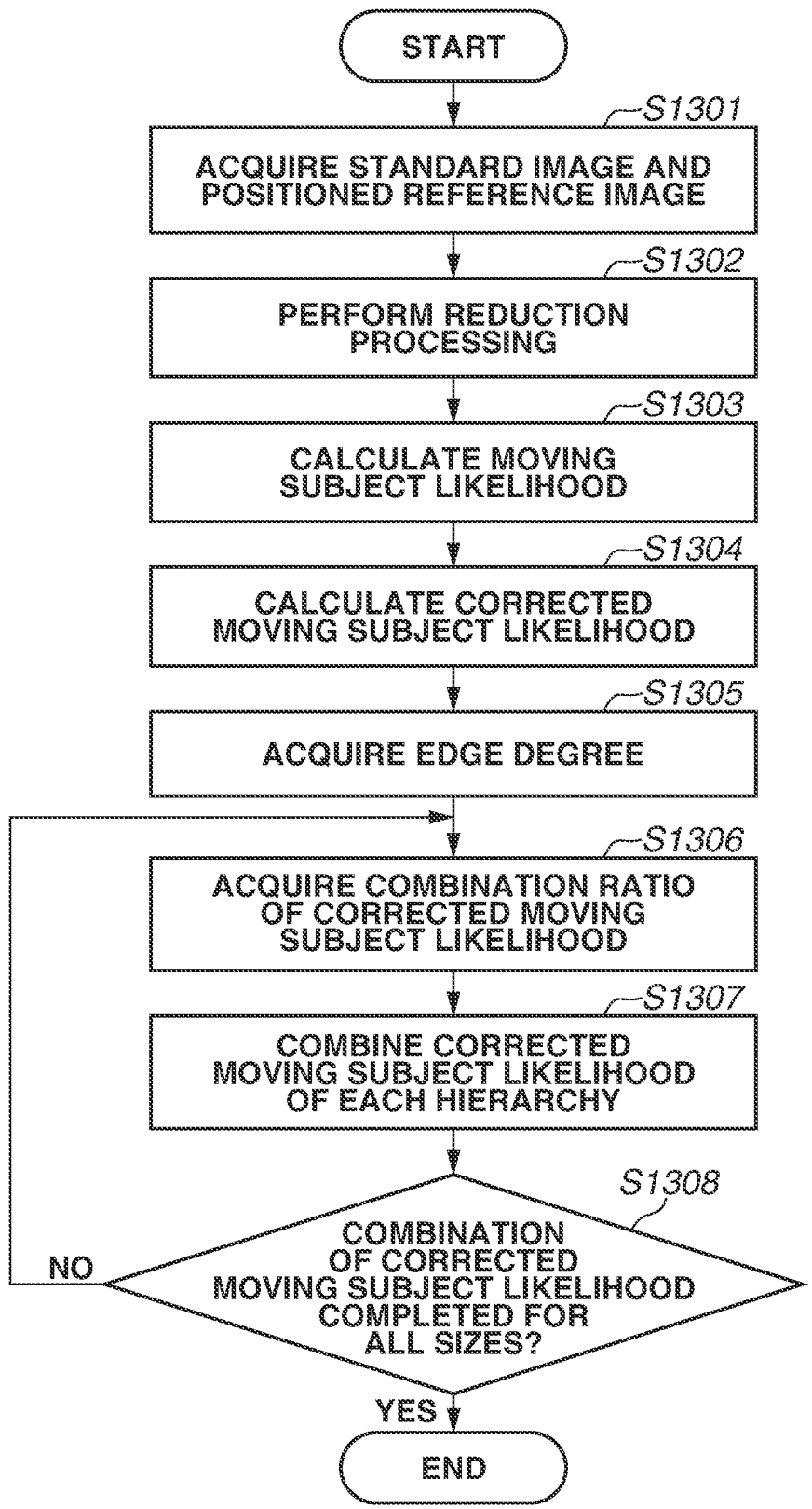
FIG. 13 is a flowchart illustrating processing of the moving subject region detection unit according to the second embodiment.

Referring to FIG. 13, in step S1301, the moving subject region detection unit 202 acquires a full-size standard image (for example, the standard image 400 illustrated in FIG. 4A)

and a full-size positioned reference image (for example, the positioned reference image 402 illustrated in FIG. 4C).

In step S1302, for example, a resolution converter (not illustrated) performs the reduction processing using smoothing processing and pixel thinning processing on the full-size standard image and positioned reference image to generate the above-described ¼-size and ¹⁄₁₆-size low-resolution images.

The reduction processing will be described below with reference to FIGS. 14, 15A, and 15B.

Figure 14:
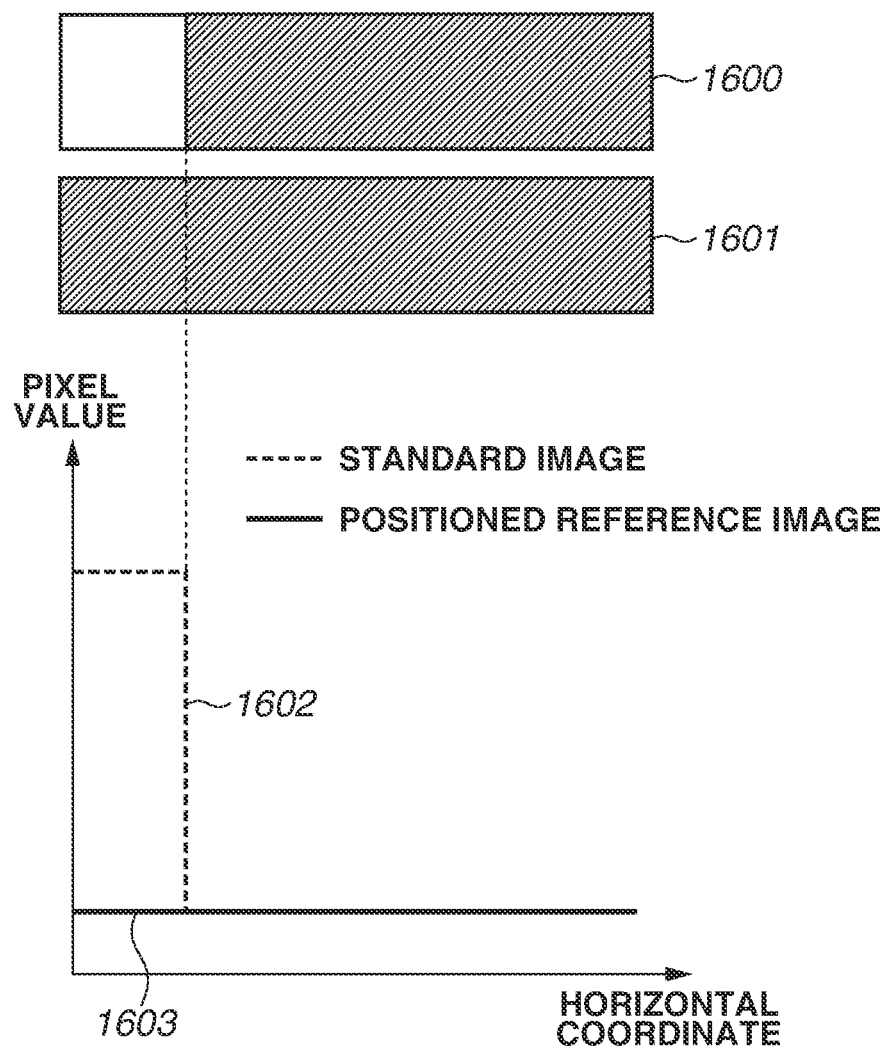
FIG. 14 illustrates full-size image data.

FIG. 14 illustrates an example pixel value of a full-size standard image 1600 and an example pixel value of a full-size positioned reference image 1601. Referring to FIG. 14, the vertical axis denotes the pixel value and the horizontal axis denotes the horizontal coordinate. The dotted line 1602 denotes an example pixel value of the full-size standard image 1600, and the solid line 1603 denotes an example pixel value of the full-size positioned reference image 1601.

According to the present embodiment, the reduction processing is performed on the full-size images illustrated in FIG. 14 to generate a ¼-size image and a ¹⁄₁₆-size image having horizontal and vertical resolutions ¼ and ¹⁄₁₆ times the resolution of the full-size images, respectively. Examples of reduction methods include the bilinear reduction method and the bicubic reduction method.

Figure 15A:
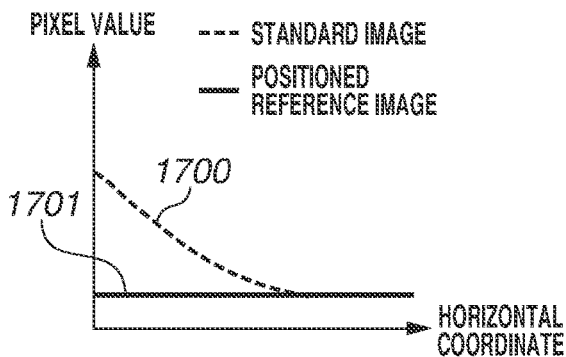
FIGS. 15A to 15H illustrate hierarchically corrected moving subject likelihood generation processing.
Figure 15B:
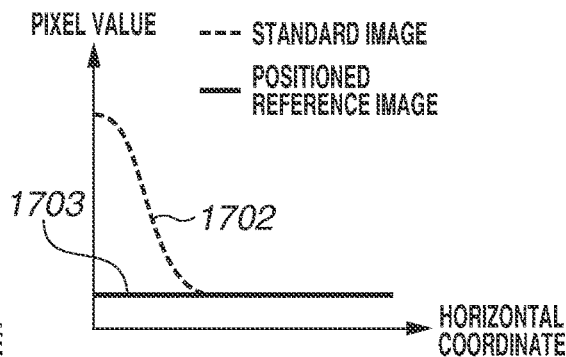

Referring to FIGS. 15A and 15B, the vertical axis denotes the pixel value and the horizontal axis denotes the horizontal coordinate. FIG. 15A illustrates a ¹⁄₁₆-size image, and FIG. 15B illustrates a ¼-size image. Referring to FIG. 15A, the dotted line 1700 denotes an example pixel value of the ¹⁄₁₆-size standard image, and the solid line 1701 denotes an example pixel value of the ¹⁄₁₆-size positioned reference image. Referring to FIG. 15B, the dotted line 1702 denotes an example pixel value of the ¼-size standard image, and the solid line 1703 denotes an example pixel value of the ¼-size positioned reference image. The pixel value (the dotted line 1700) of the ¹⁄₁₆-size standard image illustrated in FIG. 15A is smoothed to a further extent than the pixel value (the dotted line 1702) of the ¼-size standard image illustrated in FIG. 15B through the reduction processing.

Referring back to the flowchart illustrated in FIG. 13, in step S1303, each of the likelihood calculation units 1200, 1201, and 1202 obtains the interframe difference absolute value between the standard image 400 and the positioned reference image 402 having the corresponding resolutions and calculates the moving subject likelihood based on the difference absolute value.

More specifically, the likelihood calculation unit 1200 calculates the interframe difference absolute value for each pixel between the full-size standard image and the full-size positioned reference image and calculates the full-size moving subject likelihood based on the moving subject likelihood curve illustrated in FIG. 8.

Figure 15C:
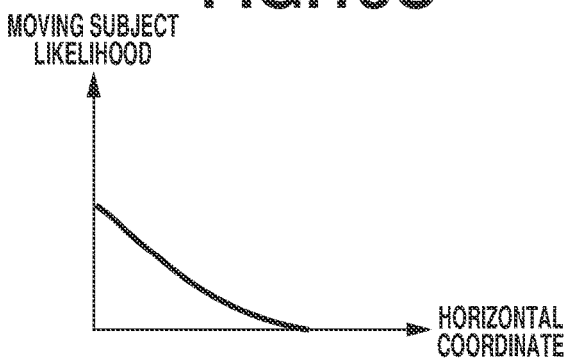
Figure 15D:
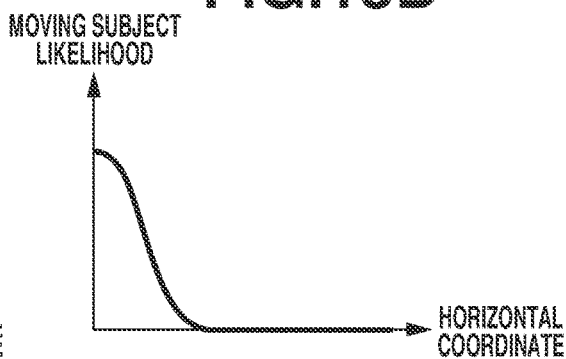

The likelihood calculation unit 1201 also calculates the interframe difference absolute value for each pixel between the ¼-size standard image and positioned reference image and acquires the ¼-size moving subject likelihood based on the moving subject likelihood curve illustrated in FIG. 8. FIG. 15D illustrates an example of the ¼-size moving subject likelihood. The vertical axis denotes the moving subject likelihood and the horizontal axis denotes the horizontal coordinate. The ¼-size moving subject likelihood illustrated in FIG. 15D is the moving subject likelihood acquired based on the ¼-size image illustrated in FIG. 15B.

Likewise, the likelihood calculation unit 1202 calculates the interframe difference absolute value for each pixel between the ¹⁄₁₆-size standard image and positioned reference image and acquires the ¹⁄₁₆-size moving subject likelihood based on the moving subject likelihood curve illustrated in FIG. 8. FIG. 15C illustrates an example of the ¹⁄₁₆-size moving subject likelihood. The vertical axis denotes the moving subject likelihood and the horizontal axis denotes the horizontal coordinate. The ¹⁄₁₆-size moving subject likelihood illustrated in FIG. 15C is the moving subject likelihood acquired based on the ¹⁄₁₆-size image illustrated in FIG. 15A.

Figure 15E:
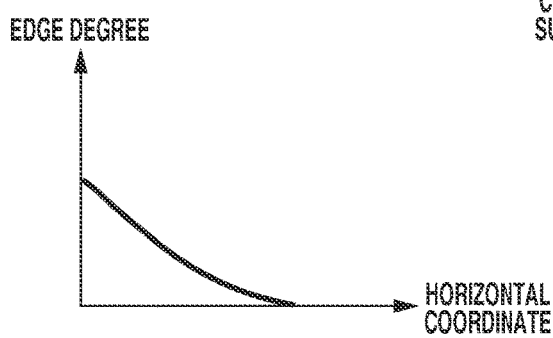
Figure 15F:
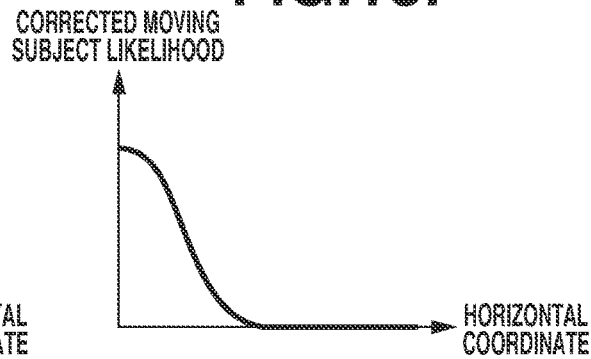

In step S1304 in FIG. 13, the likelihood correction unit 610 corrects the ¼-size moving subject likelihood based on the ¼-size-equivalent standard image horizontally and vertically enlarged from the ¹⁄₁₆-size standard image four times by the enlargement processing unit 1224, to generate the ¼-size corrected moving subject likelihood. FIG. 15F illustrates an example of the ¼-size corrected moving subject likelihood. The vertical axis denotes the corrected moving subject likelihood and the horizontal axis denotes the horizontal coordinate. The ¼-size corrected moving subject likelihood illustrated in FIG. 15F is the corrected moving subject likelihood which is obtained by correcting the ¼-size moving subject likelihood illustrated in FIG. 15D based on the ¼-size-equivalent standard image enlarged from the ¹⁄₁₆-size standard image illustrated in FIG. 15A by the enlargement processing unit 1224. A method for correcting the ¼-size moving subject likelihood by the likelihood correction unit 610 is similar to the processing according to the first embodiment, and therefore redundant descriptions thereof will be omitted.

In step S1305 in FIG. 13, each of the edge degree calculation units 1210 and 1211 acquires the edge degree based on the edge intensity calculated from the standard image 400 and the positioned reference image 402 having the corresponding resolution.

Edge intensity calculation processing will be described below. The edge intensity can be calculated, for example, by the Sobel filter processing. The edge intensity calculation processing based on the Sobel filter processing will be described below.

In the edge intensity calculation processing, each of the edge degree calculation units 1210 and 1211 first multiplies the pixel value of each of the nine coordinates around the target coordinate by the coefficient represented by formula (5) and then totals the multiplication results to calculate a vertical edge intensity Sv. Likewise, each of the edge degree calculation units 1210 and 1211 multiplies the pixel value of each of the nine coordinates around the target coordinate by the coefficient represented by formula (6) and then totals the multiplication results to calculate a horizontal edge intensity Sh.

$$Sv = \begin{pmatrix} -1 & -2 & -1 \\ 0 & 0 & 0 \\ 1 & 2 & 1 \end{pmatrix} \quad \text{Formula (5)}$$

$$Sh = \begin{pmatrix} -1 & 0 & 1 \\ -2 & 0 & 2 \\ -1 & 0 & 1 \end{pmatrix} \quad \text{Formula (6)}$$

Then, in the edge intensity calculation processing, each of the edge degree calculation units 1210 and 1211 calculates an edge intensity E which equals the square root of the sum of the squares of the vertical edge intensity Sv and the horizontal edge intensity Sh, represented by formula (7).

$$E = \sqrt{Sh^2 + Sv^2} \quad \text{Formula (7)}$$

Figure 16:
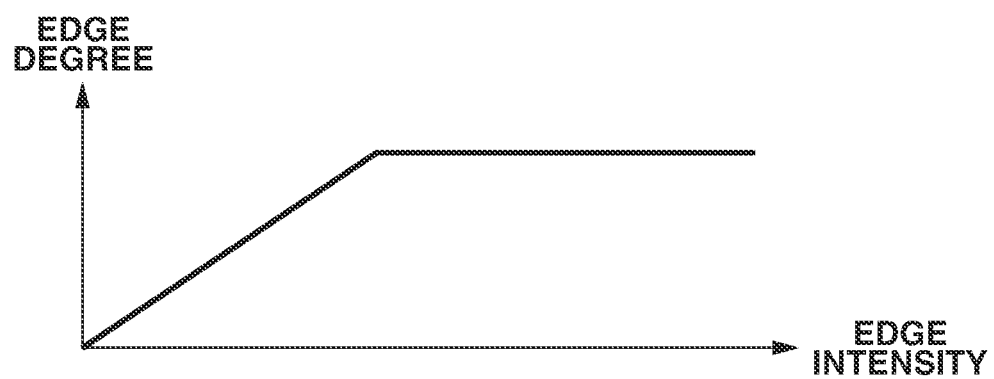
FIG. 16 illustrates an edge degree curve.

A method for acquiring the edge degree based on the edge intensity calculated as described above will be described below with reference to FIG. 16. FIG. 16 illustrates the edge degree curve used for obtaining the edge degree from the edge intensity. The vertical axis denotes the edge degree and the horizontal axis denotes the edge intensity.

The edge degree calculation unit 1210 calculates the edge intensity for each pixel as described above for the ¼-size standard image and positioned reference image and selects the higher edge intensity for each pixel. Then, based on the edge degree curve illustrated in FIG. 16, the edge degree calculation unit 1210 acquires the edge degree according to the edge intensity selected for each pixel. In this way, the edge degree obtained by the edge degree calculation unit 1210 becomes the ¼-size edge degree.

Likewise, the edge degree calculation unit 1211 calculates the edge intensity for each pixel for the ¹⁄₁₆-size standard image and positioned reference image and selects the higher edge intensity for each pixel. Then, based on the edge degree curve illustrated in FIG. 16, the edge degree calculation unit 1211 acquires the edge degree according to the edge intensity selected for each pixel. In this way, the edge degree obtained by the edge degree calculation unit 1211 becomes the ¹⁄₁₆-size edge degree. FIG. 15E illustrates an example of the ¹⁄₁₆-size edge degree. The vertical axis denotes the edge degree and the horizontal axis denotes the horizontal coordinate. The ¹⁄₁₆-size edge degree illustrated in FIG. 15E is the edge degree obtained based on the ¹⁄₁₆-size image illustrated in FIG. 15A through the edge degree acquisition processing described in step S1305.

In step S1306 in FIG. 13, each of the combination ratio calculation unit 1230 and 1231 obtains the combination ratio of the corrected moving subject likelihood required for the likelihood combination units 1240 and 1241 to combine the corrected moving subject likelihood, respectively, based on the edge degree acquired as described above.

In step S1307, each of the likelihood combination unit 1240 and 1241 combines the corrected moving subject likelihood or the moving subject likelihood based on the combination ratio of the corrected moving subject likelihood acquired in step S1306, to generate the hierarchically corrected moving subject likelihood.

In step S1308, the likelihood combination unit 1240 determines whether the combination of the corrected moving subject likelihood is completed for all sizes (all resolutions). When the likelihood combination unit 1240 determines that the combination of the corrected moving subject likelihood is not completed for all sizes (NO in step S1308), the processing returns to step S1306. The likelihood combination unit 1240 repeats the processing in steps S1306 and S1307 until it determines that the combination of the corrected moving subject likelihood is completed for all sizes.

Moving subject likelihood combination processing for each resolution (each size) in steps S1306, S1307, and S1308 illustrated in FIG. 13 will be described below.

First of all, ¼-size corrected moving subject likelihood combination processing will be described below with reference to FIGS. 12, 15G, 15H, and 17.

The combination ratio calculation unit 1231 sets the combination ratio of the ¼-size corrected moving subject likelihood to be combined by the likelihood combination unit 1241 based on the ¼-size edge degree horizontally and vertically enlarged from the ¹⁄₁₆-size edge degree four times by the enlargement processing unit 1222. When the ¹⁄₁₆-size edge degree and moving subject likelihood are horizontally and vertically enlarged four times into the ¼-size-equivalent resolution as described above, the combination ratio of the corrected moving subject likelihood acquired by the combination ratio calculation unit 1231 also becomes the ¼-size-equivalent resolution.

Figure 15G:
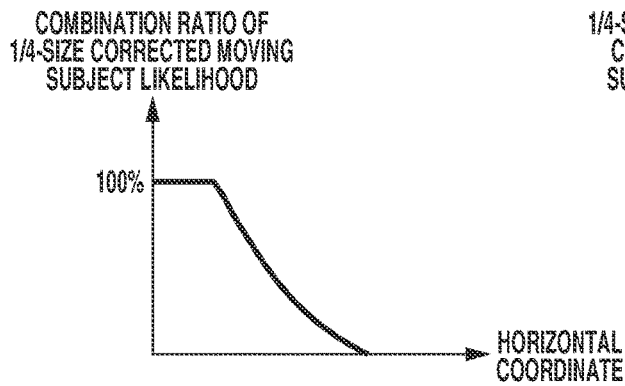

FIG. 15G illustrates an example of the combination ratio of the ¼-size corrected moving subject likelihood. The vertical axis denotes the combination ratio of the ¼-size corrected moving subject likelihood, and the horizontal axis denotes the horizontal coordinate. The combination ratio of the ¼-size corrected moving subject likelihood illustrated in FIG. 15G is the combination ratio acquired from the curve illustrated in FIG. 17 based on the ¼-size-equivalent edge degree enlarged from the ¹⁄₁₆-size edge degree illustrated in FIG. 15E.

Then, based on the combination ratio of the ¼-size corrected moving subject likelihood, the likelihood combination unit 1241 combines the ¼-size moving subject likelihood and the ¼-size-equivalent moving subject likelihood enlarged from the ¹⁄₁₆-size moving subject likelihood by the enlargement processing unit 1223, by using formula (8). In this way, the ¼-size hierarchically corrected moving subject likelihood is calculated.

$$MC4 = wm4 * M4 + (1 - wm4) * M16 \quad \text{Formula (8)}$$

Referring to the formula (8), M4 denotes the ¼-size corrected moving subject likelihood, M16 denotes the moving subject likelihood horizontally and vertically enlarged from the ¹⁄₁₆-size moving subject likelihood four times by the enlargement processing unit 1223, wm4 denotes the combination ratio of the ¼-size corrected moving subject likelihood, and MC4 denotes the ¼-size hierarchically corrected moving subject likelihood.

Figure 15H:
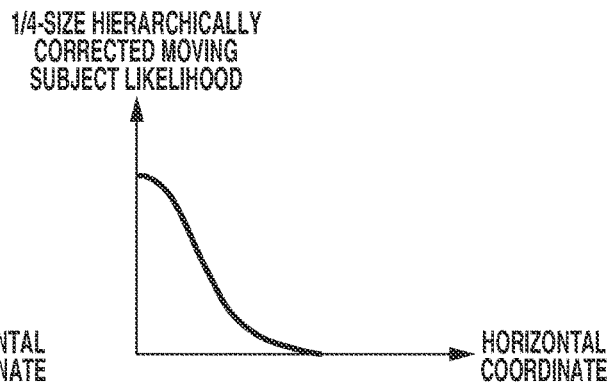

FIG. 15H illustrates an example of the ¼-size hierarchically corrected moving subject likelihood. The vertical axis denotes the ¼-size hierarchically corrected moving subject likelihood, and the horizontal axis denotes the horizontal coordinate. The ¼-size hierarchically corrected moving subject likelihood illustrated in FIG. 15H is obtained by combining the ¼-size corrected moving subject likelihood illustrated in FIG. 15F and the ¹⁄₁₆-size moving subject likelihood illustrated in FIG. 15C based on the combination ratio of the ¼-size corrected moving subject likelihood illustrated in FIG. 15G.

Figure 17:
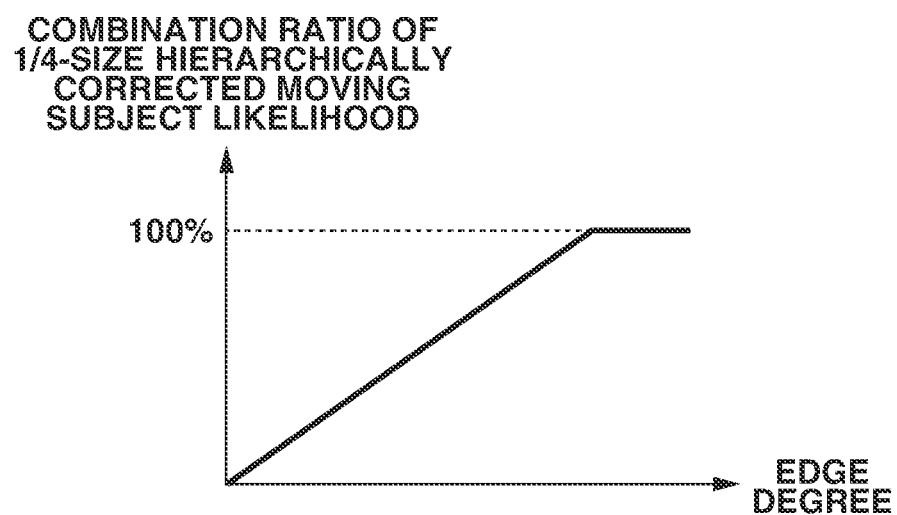
FIG. 17 illustrates a combination ratio curve of a hierarchically corrected moving subject likelihood.

FIG. 17 illustrates an example of the combination ratio curve of the ¼-size hierarchically corrected moving subject likelihood. The vertical axis denotes the combination ratio and the horizontal axis denotes the edge degree. As illustrated in FIG. 17, the combination ratio curve of the ¼-size hierarchically corrected moving subject likelihood is set so that the combination ratio of the ¼-size hierarchically corrected moving subject likelihood increases with increasing edge degree. With the ¼-size hierarchically corrected moving subject likelihood, the combination ratio of the ¹⁄₁₆-size moving subject likelihood increases in flat portions having a low edge degree, and the combination ratio of the ¼-size corrected moving subject likelihood increases in edge portions having a high edge degree.

In addition, random noise in a ¹⁄₁₆-size image is reduced to a lower level than random noise in a ¼-size image through the smoothing processing in the reduction processing. Therefore, with the ¹⁄₁₆-size moving subject likelihood, random noise is less likely to be detected as a motion than with the ¼-size moving subject likelihood. More specifically, in flat portions having a low edge degree, the ¼-size hierarchically corrected moving subject likelihood not easily affected by random noise can be generated by increasing the combination ratio of the ¹⁄₁₆-size moving subject likelihood not easily affected by random noise.

More specifically, the combination ratio of the ¼-size corrected moving subject likelihood illustrated in FIG. 15G is 0% in a region where the ¹/₁₆-size edge degree illustrated in FIG. 15E is low. Therefore, in flat portions having a low edge degree, the combination ratio of the ¹/₁₆-size moving subject likelihood is 100% which suppresses the influence of random noise.

On the other hand, the contour of a moving subject (the boundary between the moving subject and the background) has a high edge degree and therefore is applied with a large combination ratio of the ¼-size corrected moving subject likelihood. This allows generating the hierarchically corrected moving subject likelihood more closely associated with the contour of the moving subject than using the ¹/₁₆-size moving subject likelihood after being horizontally and vertically enlarged four times.

More specifically, the ¼-size hierarchically corrected moving subject likelihood illustrated in FIG. 15H is sharper than the ¹/₁₆-size moving subject likelihood illustrated in FIG. 15C. This is because the combination ratio of the ¼-size corrected moving subject likelihood illustrated in FIG. 15G has increased under the influence of the increased ¹/₁₆-size edge degree illustrated in FIG. 15E in the vicinity of the contour of the moving subject.

The full-size moving subject likelihood combination processing is performed in a similar way to the ¼-size moving subject likelihood combination processing. More specifically, based on the full-size edge degree horizontally and vertically enlarged from the ¼-size edge degree four times, the likelihood combination unit 1240 combines the full-size moving subject likelihood and the hierarchically corrected moving subject likelihood horizontally and vertically enlarged from the ¼-size hierarchically corrected moving subject likelihood four times to generate the full-size hierarchically corrected moving subject likelihood.

Although the second embodiment has been described above centering on an example where only the ¼-size moving subject likelihood, i.e., the moving subject likelihood calculated from low-resolution images is corrected, the processing is not limited thereto. For example, it is also possible to correct the ¹/₁₆-size moving subject likelihood corresponding to images having a resolution lower than the ¼ size. Like the first embodiment, the moving subject likelihood corresponding to full-size images may be corrected also in the second embodiment.

For example, the full-size moving subject likelihood not having undergone the reduction processing has a tendency that random noise has a large amplitude and an increased moving subject likelihood. Therefore, when correcting the full-size moving subject likelihood, it is desirable that the moving subject likelihood weight coefficient acquired by the likelihood coefficient calculation unit 612 is made smaller than the ¼ size. More specifically, the moving subject likelihood weight coefficient is made smaller than the ¼ size by decreasing the slope of the moving subject likelihood weight coefficient curve illustrated in FIG. 10 or increasing the x-intercept.

Since the ¹/₁₆-size moving subject likelihood has a resolution lower than the full size, the result of correcting the ¹/₁₆-size moving subject likelihood affects a wide region when converted into the full-size. Therefore, if the similarity between the moving subject and the background is high, the peripheral region of the moving subject region may also possibly be detected as a moving subject region. Therefore, when correcting the ¹/₁₆-size moving subject likelihood, the averaging processing unit 614 may perform the weighted addition averaging processing on the moving subject likelihood of a smaller peripheral region at the time of the weighted addition averaging processing on the moving subject likelihood of the peripheral region. For example, when correcting the ¼-size moving subject likelihood, the averaging processing unit 614 performs the weighted addition averaging processing on the moving subject likelihood of the peripheral region composed of 5×5 pixels. When correcting the ¹/₁₆-size moving subject likelihood, the averaging processing unit 614 performs the weighted addition averaging processing on the moving subject likelihood of the peripheral region composed of 3×3 pixels.

As described above, the imaging apparatus 100 according to the second embodiment uses the hierarchically corrected moving subject likelihood to prevent a stationary region around the moving subject from being incorrectly detected as a moving subject region and prevent random noise from being incorrectly detected as a moving subject region. Therefore, the imaging apparatus 100 according to the second embodiment makes it possible to more accurately detect a moving subject as a moving subject region.

The above-described imaging apparatus 100 according to the first and the second embodiments is applicable to digital cameras, digital camcorders, portable terminals (such as smart phones and tablet terminals having camera functions), monitoring cameras, industrial cameras, onboard cameras, and medical camera.

The processing by the image processing unit according to the above-described embodiments may be performed by hardware configurations, or a part of the processing may be implemented by software configurations and the remaining part thereof may be implemented by hardware configurations. When the processing is performed by software, for example, the processing is implemented when the CPU executes a program stored in the ROM.

The present disclosure can also be achieved when a program for implementing at least one of the functions according to the above-described embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

The above-described embodiments are to be considered as illustrative in embodying the present disclosure, and not restrictive of the technical scope of the present disclosure. The present disclosure may be embodied in diverse forms without departing from the technical concepts or essential characteristics thereof.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2018-027878, filed Feb. 20, 2018, which is hereby incorporated by reference herein in its entirety.

What is claimed is:

1. An image processing apparatus to detect a moving subject region, the image processing apparatus comprising:
a memory that stores instructions; and
one or more processors configured to execute the instructions to cause the image processing apparatus to function as:
a likelihood generation unit configured to detect a motion of a region in a first image and, based on at least two input images, generate a moving subject likelihood for each region in the first image,
a similarity detection unit configured to detect, as a detected similarity, a similarity between a target region and a peripheral region of the target region for at least one of the at least two input images, and
a correction unit configured to correct the generated moving subject likelihood of the target region based on the detected similarity and the generated moving subject likelihood of the peripheral region,
wherein the moving subject region is detected based on the corrected moving subject likelihood of the target region.

2. The image processing apparatus according to claim 1, wherein the correction unit corrects the generated moving subject likelihood of the target region to increase the moving subject likelihood of the target region.

3. The image processing apparatus according to claim 1, wherein the likelihood generation unit is configured to use at least one of the at least two input images as a standard image for detecting the motion of the region in the first image, and
wherein the similarity detection unit is configured to detect a similarity between a target region and a peripheral region of the target region for the standard image.

4. The image processing apparatus according to claim 1, wherein executing the instructions further causes the image processing apparatus to function as an image combination unit configured to combine the at least two input images based on the corrected moving subject likelihood of the target region.

5. The image processing apparatus according to claim 1, wherein the likelihood generation unit is configured to generate a moving subject likelihood of at least one pixel of the target region and of the peripheral region,
wherein the similarity detection unit is configured to detect, as a pixel value similarity, a similarity between a pixel value of the at least one pixel of the target region and a pixel value of the at least one pixel of the peripheral region, and
wherein the correction unit corrects the generated moving subject likelihood of the at least one pixel of the target region based on the pixel value similarity and the moving subject likelihood of the at least one pixel of the peripheral region.

6. The image processing apparatus according to claim 5, wherein the similarity detection unit is configured to calculate the pixel value similarity based on a difference between the pixel value of the at least one pixel of the target region and the pixel value of the at least one pixel of the peripheral region.

7. The image processing apparatus according to claim 5, wherein the similarity detection unit is configured to calculate the pixel value similarity based on a difference between an average pixel value of the at least one pixel of the target region and the pixel value of the at least one pixel of the peripheral region.

8. The image processing apparatus according to claim 1, wherein executing the instructions further causes the image processing apparatus to function as a coefficient acquisition unit configured to acquire a weight coefficient for correcting the generated moving subject, likelihood of the target region, and
wherein the correction unit corrects the generated moving subject likelihood of the target region based on the acquired weight coefficient.

9. The image processing apparatus according to claim 8, wherein the coefficient acquisition unit is configured to calculate a weight coefficient for the target and peripheral regions, and
wherein, based on the calculated weight coefficient, the correction unit performs weighted addition averaging processing on the generated moving subject likelihoods of the target and peripheral regions to correct the generated moving subject likelihood of the target region.

10. The image processing apparatus according to claim 8, wherein the coefficient acquisition unit is configured to calculate a weight coefficient based on the detected similarity and the generated moving subject likelihood of the peripheral region.

11. The image processing apparatus according to claim 8, wherein the coefficient acquisition unit is configured to increase an acquired weight coefficient of the generated moving subject likelihood of the peripheral region with an increase in the generated moving subject likelihood of the peripheral region.

12. The image processing apparatus according to claim 8, wherein the coefficient acquisition unit is configured to increase an acquired weight coefficient of the generated moving subject likelihood of the peripheral region with an increase in the similarity between the target region and the peripheral region.

13. The image processing apparatus according to claim 8, wherein, in a case where the generated moving subject likelihood of the peripheral region is high and the similarity of the peripheral region to the target region is high, the coefficient acquisition unit increases an acquired weight coefficient of the generated moving subject likelihood of the peripheral region.

14. The image processing apparatus according to claim 8, wherein the coefficient acquisition unit is configured to change the acquired weight coefficient according to a noise amount contained in at least one of the at least two input images.

15. The image processing apparatus according to claim 1, wherein the target region is one pixel.

16. The image processing apparatus according to claim 1, wherein executing the instructions further causes the image processing apparatus to function as:
   a hierarchical likelihood generation unit configured to generate a moving subject likelihood based on a low-resolution image obtained by converting at least one of the at least two input images into a low resolution,
   an edge degree acquisition unit configured to acquire an edge degree based on at least one of an edge intensity of the at least one of the at least two input images and an edge intensity of the low-resolution image,
   a ratio setting unit configured to set a combination ratio based on the edge degree, and
   a likelihood combination unit configured to combine, according to the set combination ratio, the moving subject likelihood generated by the likelihood generation unit and the moving subject likelihood generated by the hierarchical likelihood generation unit.

17. The image processing apparatus according to claim 16, wherein the hierarchical likelihood generation unit is configured to generate a plurality of the low-resolution images converted to provide a plurality of different resolutions.

18. The image processing apparatus according to claim 16, wherein the correction unit is configured to correct the moving subject likelihood generated by the hierarchical likelihood generation unit.

19. A method for an image processing apparatus to detect a moving subject region, the method comprising:
   detecting a motion of a region in a first image and, based on at least two input images, generating a moving subject likelihood for each region in the first image;
   detecting, as a detected similarity, a similarity between a target region and a peripheral region of the target region for at least one of the at least two input images; and
   correcting the generated moving subject likelihood of the target region based on the detected similarity and the generated moving subject likelihood of the peripheral region,
   wherein the moving subject region is detected based on the corrected moving subject likelihood of the target region.

20. A non-transitory storage medium storing a program to cause a computer to perform a method for an image processing apparatus to detect a moving subject region, the method comprising:
   detecting a motion of a region in a first image and, based on at least two input images, generating a moving subject likelihood for each region in the first image;
   detecting, as a detected similarity, a similarity between a target region and a peripheral region of the target region for at least one of the at least two input images; and
   correcting the generated moving subject likelihood of the target region based on the detected similarity and the generated moving subject likelihood of the peripheral region,
   wherein the moving subject region is detected based on the corrected moving subject likelihood of the target region.

* * * * *